US012699853B2

(12) United States Patent
Malkiel et al.

(10) Patent No.: US 12,699,853 B2
(45) Date of Patent: Aug. 4, 2026

(54) LANGUAGE MODEL HALLUCINATION DETECTION

(71) Applicant: Microsoft Technology Licensing, LLC, Redmond, WA (US)

(72) Inventors: Itzik Malkiel, Ramat Gan (IL); Yakir Yehuda, Tirat Carmel (IL); Oren Barkan, Tel Aviv (IL); Yonathan Weill, Tel Aviv (IL); Noam Koenigstein, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 137 days.

(21) Appl. No.: 18/418,284

(22) Filed: Jan. 21, 2024

(65) Prior Publication Data

US 2025/0238629 A1 Jul. 24, 2025

(51) Int. Cl.
*G06F 40/40* (2020.01)
*G06F 40/30* (2020.01)

(52) U.S. Cl.
CPC .............. *G06F 40/40* (2020.01); *G06F 40/30* (2020.01)

(58) Field of Classification Search
None
See application file for complete search history.

(56) References Cited

U.S. PATENT DOCUMENTS

2017/0371955 A1* 12/2017 Allen .................. G06F 16/3329
2020/0320169 A1* 10/2020 Boxwell ................ G06N 3/045
2021/0089723 A1* 3/2021 Higashinaka .......... G06N 20/00
2025/0061286 A1* 2/2025 Zhou ....................... G06F 40/30

OTHER PUBLICATIONS

Es et al., "RAGAS: Automated Evaluation of Retrieval Augmented Generation" (Year: 2023).*
Ji et al., "Towards Mitigating Hallucination in Large Language Models via Self-Reflection" (Year: 2023).*

(Continued)

*Primary Examiner* — Paras D Shah
*Assistant Examiner* — Jacob B Vogt
(74) *Attorney, Agent, or Firm* — Seed Intellectual Property Law Group LLP

(57) ABSTRACT

In some embodiments, a language model forward traversal with a few-shot learning forward prompt yields a primary answer from a primary question. Then at least one backward traversal yields at least one candidate question using backward prompt(s) with answer-question pairs derived from the forward prompt's question-answer pairs. Each backward prompt also includes the primary answer but not the primary question. Each backward traversal is through one or more language models, not necessarily including the forward traversal's language model. Sometimes backward traversals vary model temperature, top-p, or top-k. A vector distance calculated between at least some candidate question vectors and a primary question vector indicates whether the primary answer includes hallucination content, and in some cases how much. Some embodiments withhold hallucinated answers from user interfaces and device control interfaces. Some embodiments also loop to obtain an answer with less hallucination content.

15 Claims, 9 Drawing Sheets

(56) References Cited

OTHER PUBLICATIONS

Jiang et al., "Forward-Backward Reasoning in Large Language Models for Mathematical Verification" (Year: 2023).*

Lee et al. "Factuality Enhanced Language Models for Open-Ended Text Generation" (Year: 2023).*

Li et al., "Python Code Generation by Asking Clarification Questions" (Year: 2023).*

Amos Azaria and Tom Mitchell, "The Internal State of an LLM Knows When It's Lying", retrieved from << http://arxiv.org/abs/2304.13734 >>, Oct. 17, 2023, 10 pages.

F.C. Bartlett, "Remembering: A study in experimental and social psychology", Cambridge University Press, no later than Dec. 31, 1932.

Neil Brewer, et al., "Beliefs and data on the relationship between consistency and accuracy of eyewitness testimony", Applied Cognitive Psychology: The Official Journal of the Society for Applied Research in Memory and Cognition, 13(4):297-313, no later than Dec. 31, 1999.

Tom Brown, et al., "Language Models are Few-Shot Learners", retrieved from << https://proceedings.neurips.cc/paper_files/paper/2020/file/1457c0d6bfcb4967418bfb8ac142f64a-Paper.pdf >>, 25 pages, no later than Dec. 31, 2020.

Zihan Chen, et al., "Quora Question Pairs", retrieved from << https://www.semanticscholar.org/paper/Quora-Question-Pairs-Chen-Zhang/8ff46c88964a36985f2b45933a3d47b81bd87bd0 >>, 6 pages, no later than Dec. 31, 2017.

Aakanksha Chowdhery, et al., "PaLM: Scaling Language Modeling with Pathways", retrieved from << http://arxiv.org/abs/2204.02311 >>, 87 pages, Oct. 5, 2022.

Jacob Devlin, "BERT: Pre-training of Deep Bidirectional Transformers for Language Understanding", retrieved from << https://doi.org/10.18653/v1/N19-1423 >>, 16 pages, Jun. 2-Jun. 7, 2019.

Rachel E. Dianiska and Christian A. Meissner, "The effect of credibility assessment techniques on consistency and subsequent memory for the truth", DOI https://doi.org/10.3389/fpsyg.2023.1184055, 11 pages, Jun. 26, 2023.

Jinlan Fu, et al., "GPTScore: Evaluate as You Desire", retrieved from << http://arxiv.org/abs/2302.04166 >>, 22 pages, Feb. 13, 2023.

Pär Anders Granhag and Leif A. Strömwall, "Deception detection based on repeated interrogations", Legal and Criminological Psychology (2001), 6, 85-101, no later than Dec. 31, 2001.

Ziwei Ji, et al., "Survey of Hallucination in Natural Language Generation", retrieved from << https://doi.org/10.1145/3571730 >>, 38 pages, no later than Mar. 31, 2023.

Saurav Kadavath, et al., "Language Models (Mostly) Know What They Know", retrieved from << http://arxiv.org/abs/2207.05221 >>, 43 pages, Nov. 21, 2022.

Wojciech Krycinski, et al., "Evaluating the Factual Consistency of Abstractive Text Summarization", retrieved from << https://doi.org/10.18653/v1/2020.emnlp-main.750 >>, 15 pages, Nov. 16-20, 2020.

Stephanie Lin, et al., "TruthfulQA: Measuring How Models Mimic Human Falsehoods", retrieved from << https://doi.org/10.18653/v1/2022.acl-long.229 >>, 39 pages, May 22-27, 2022.

Tianyu Liu, et al., "A Token-level Reference-free Hallucination Detection Benchmark for Free-form Text Generation", retrieved from << https://doi.org/10.18653/v1/2022.acl-long.464 >>, 15 pages, May 22-27, 2022.

Potsawee Manakul, et al., "MQAG: Multiple-choice Question Answering and Generation for Assessing Information Consistency in Summarization", retrieved from << http://arxiv.org/abs/2301.12307 >>, 15 pages, Sep. 7, 2023.

Potsawee Manakul, et al., "SELFCHECKGPT: Zero-Resource Black-Box Hallucination Detection for Generative Large Language Models", retrieved from << http://arxiv.org/abs/2303.08896 >>, 14 pages, Oct. 11, 2023.

Joshua Maynez, et al., "On Faithfulness and Factuality in Abstractive Summarization", retrieved from << https://doi.org/10.18653/v1/2020.acl-main.173 >>, 14 pages, Jul. 5-10, 2020.

Nils Reimers and Iryna Gurevych, "Sentence-BERT: Sentence Embeddings using Siamese BERT-Networks", retrieved from << https://doi.org/10.18653/v1/D19-1410 >>, 11 pages, Nov. 3-7, 2019.

Kurt Shuster, et al., "Dialogue in the Wild: Learning from a Deployed Role-Playing Game with Humans and Bots", retrieved from << https://doi.org/10.18653/v1/2021.findings-acl.54 >>, 14 pages, Aug. 1-6, 2021.

Hugo Touvron, et al., "LLaMA: Open and Efficient Foundation Language Models", retrieved from << http://arxiv.org/abs/2302.13971 >>, 27 pages, Feb. 27, 2023.

Hugo Touvron, et al., "Llama 2: Open Foundation and Fine-Tuned Chat Models", retrieved from << https://arxiv.org/abs/2307.09288 >>, 77 pages, Jul. 19, 2023.

Peter S. Park, et al. "AI Deception: A Survey of Examples, Risks, and Potential Solutions", retrieved from << https://arxiv.org/abs/2308.14752 >>, 30 pages, Aug. 28, 2023.

"Softmax function", retrieved from << https://en.wikipedia.org/wiki/Softmax_function >>, 10 pages, Jan. 5, 2024.

"Temperature, top_p and top_k for chatbot responses", retrieved from << https://community.openai.com/t/temperature-top-p-and-top-k-for-chatbot-responses/295542/print >>, Jul. 1, 11, 2023, 5 pages.

JD Prater, "14 Best Open Source Text Embedding Models", retrieved from << https://www.graft.com/blog/open-source-text-embedding-models >, Oct. 23, 2023, 29 pages.

Es, et al., "RAGAs: Automated Evaluation of Retrieval Augmented Generation", Association for Computational Linguistics, no later than Mar. 31, 2024, pp. 150-158.

Extended European search report received for European Application No. 25150322.3, mailed on Jun. 4, 2025, 12 pages.

* cited by examiner

SOME ASPECTS OF HALLUCINATION DETECTION 206

| FORWARD PROMPT 402 | BACKWARD PROMPT 404 | REVERSAL 406 |
|---|---|---|

| PRIMARY QUESTION 310 | PRIMARY ANSWER 408 | FRAMEWORK 410 |
|---|---|---|

| FORWARD LANGUAGE MODEL (FLLM) 412 | USER INTERFACE 414 | BACKWARD LANGUAGE MODEL SET (BLLM) 318 |
|---|---|---|

| PRIMARY QUESTION VECTOR 418 | CANDIDATE QUESTION 308 VECTOR 420 |
|---|---|

| FORWARD MODEL INTERFACE 422, 134, BACKWARD MODEL INTERFACE 424, 134 | QUESTION-ANSWER PAIR 426: QUESTION 428, ANSWER 430 |
|---|---|

VECTOR 432 SIMILARITY 434 METRIC 436 MEASUREMENT 438

| LANGUAGE MODEL PARAMETER 314: TEMPERATURE 440, TOP-P 442, TOP-K 444 | EMBEDDING SPACE 446 |
|---|---|
| | RETRIEVED CONTEXT 448 |

| VERIFIED ANSWER 450 | INPUT 452 REPRESENTING HUMAN REVIEW 454 |
|---|---|

| THRESHOLD 456 | ACCEPTABILITY 458 | SETTING 460 | EXTENT 216 |
|---|---|---|---|

| SUBSTITUTE QUESTION 462 | NOT-HUMAN-PERCEPTIBLE 464 FORM 466 |
|---|---|

| SEQUENCE 468 | SEMANTICALLY INTERCHANGEABLE 470 QUESTION 472 |
|---|---|

| INCREMENT 474 | DIFFERENT ANSWER 476 | CONTROLLED DEVICE 478 |
|---|---|---|

| NATURAL LANGUAGE TEXT 480, 482 | SOURCE CODE 484, 482 |
|---|---|

| IMAGE 486 | VIDEO 488 | AUDIO 490 | SENSOR DATA 492 |
|---|---|---|---|

| DATASET 494 | AMOUNT 496 | ACTION 498 | DURATION 401 |
|---|---|---|---|

| TIME/DATE 403 | CITE 405 | IDENTIFIER 407 | LOCATION 409 |
|---|---|---|---|

| STATEMENT 411 | NAME 413 | STATUS 415 | INFORMATION 417 |
|---|---|---|---|

| DATA TYPE 425 | ANSWER-QUESTION-PAIR 419: ANSWER 430, QUESTION 428 |
|---|---|

| CONTROL SEQUENCE 423 | AMOUNT 421 OF UNACCEPTABLE ANSWERS 430 |
|---|---|

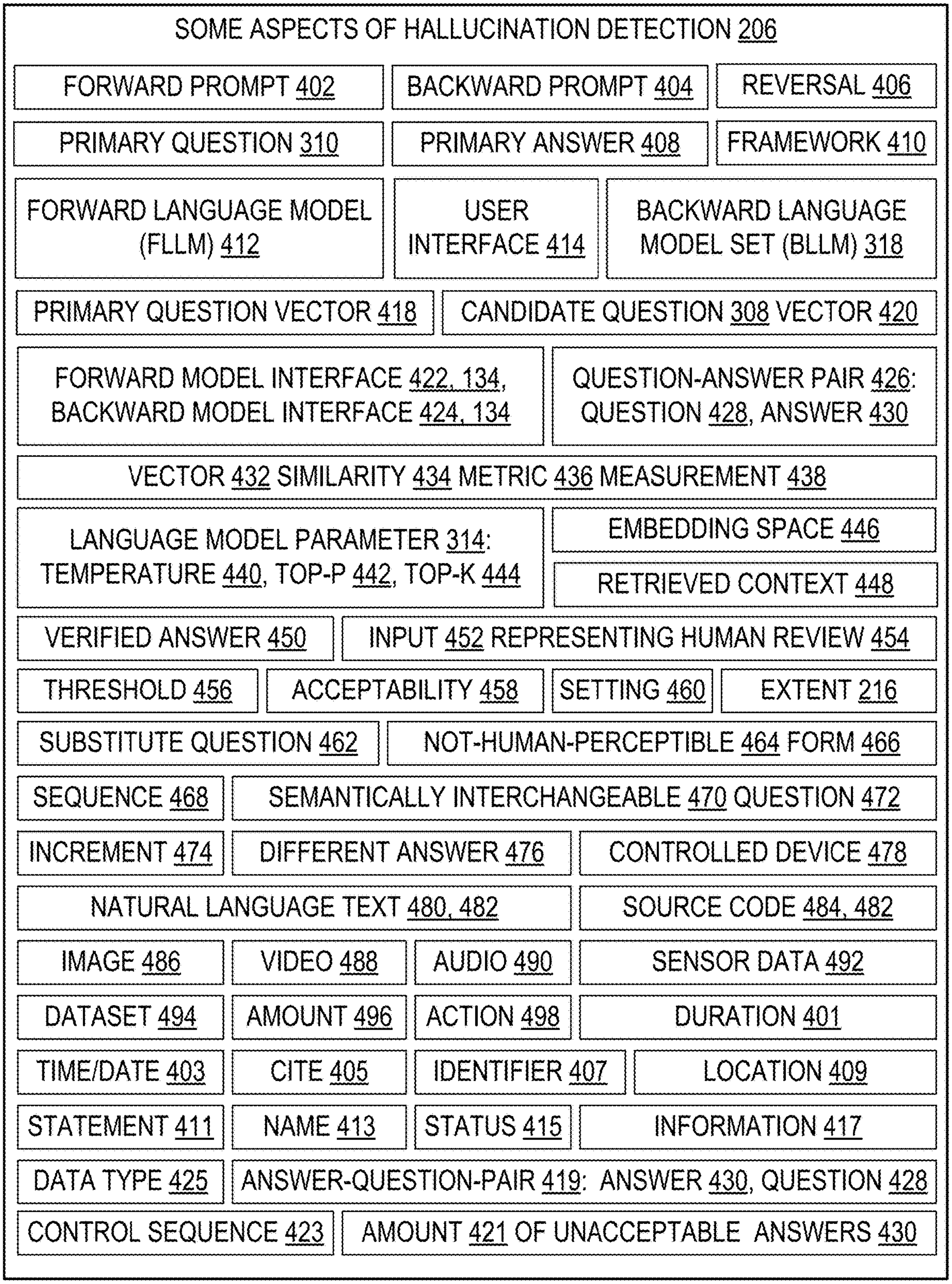

Fig. 4

METHOD 800

START

SUBMIT 802 FORWARD PROMPT, OBTAIN 804 PRIMARY ANSWER

SUBMIT 806 BACKWARD PROMPT, ACQUIRE 808 CANDIDATE QUESTION

GET 810 VECTOR DISTANCE BETWEEN PRIMARY Q AND CANDIDATE Q

ASSIGN 812 HALLUCINATION EXTENT BASED ON VECTOR DISTANCE

FINISH

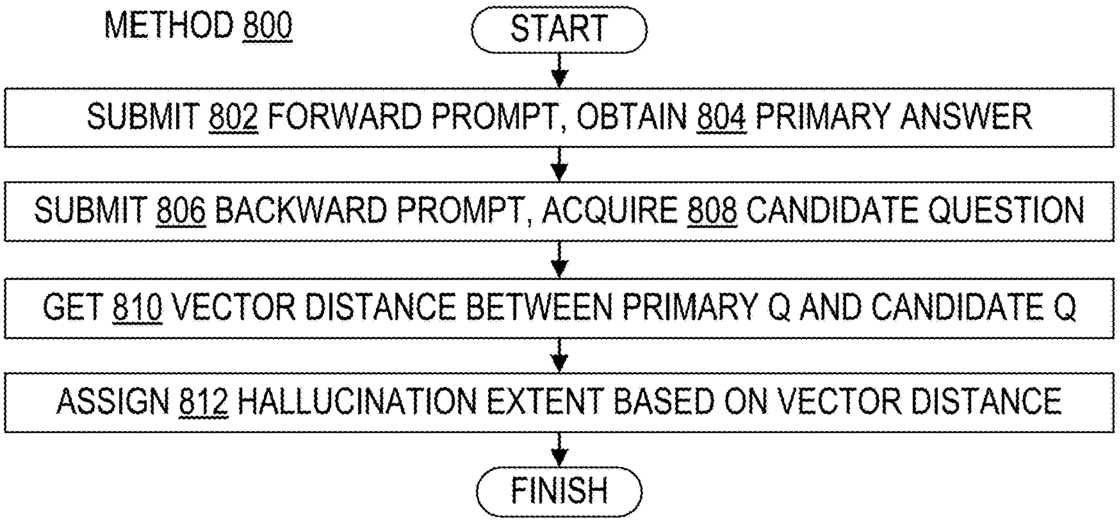

Fig. 8

METHOD 900

START

SUBMIT 802 FORWARD PROMPT, OBTAIN 804 PRIMARY ANSWER

SUBMIT 806 BACKWARD PROMPT, ACQUIRE 808 CANDIDATE QUESTION

PROCURE 902 EMBEDDING VECTORS FOR QUESTIONS

CALCULATE 904 VECTOR DISTANCE, I.E., SIMILARITY MEASUREMENT

ASSIGN 812 HALLUCINATION EXTENT BASED ON VECTOR DISTANCE

REPORT 906 HALLUCINATION EXTENT, E.G., VIA USER INTERFACE OR CONTROLLED DEVICE INTERFACE

WITHHOLD 908 HALLUCINATION EXTENT FROM USER INTERFACE

FINISH

PROMPT 910, 900 FOR DIFFERENT ANSWER

FINISH

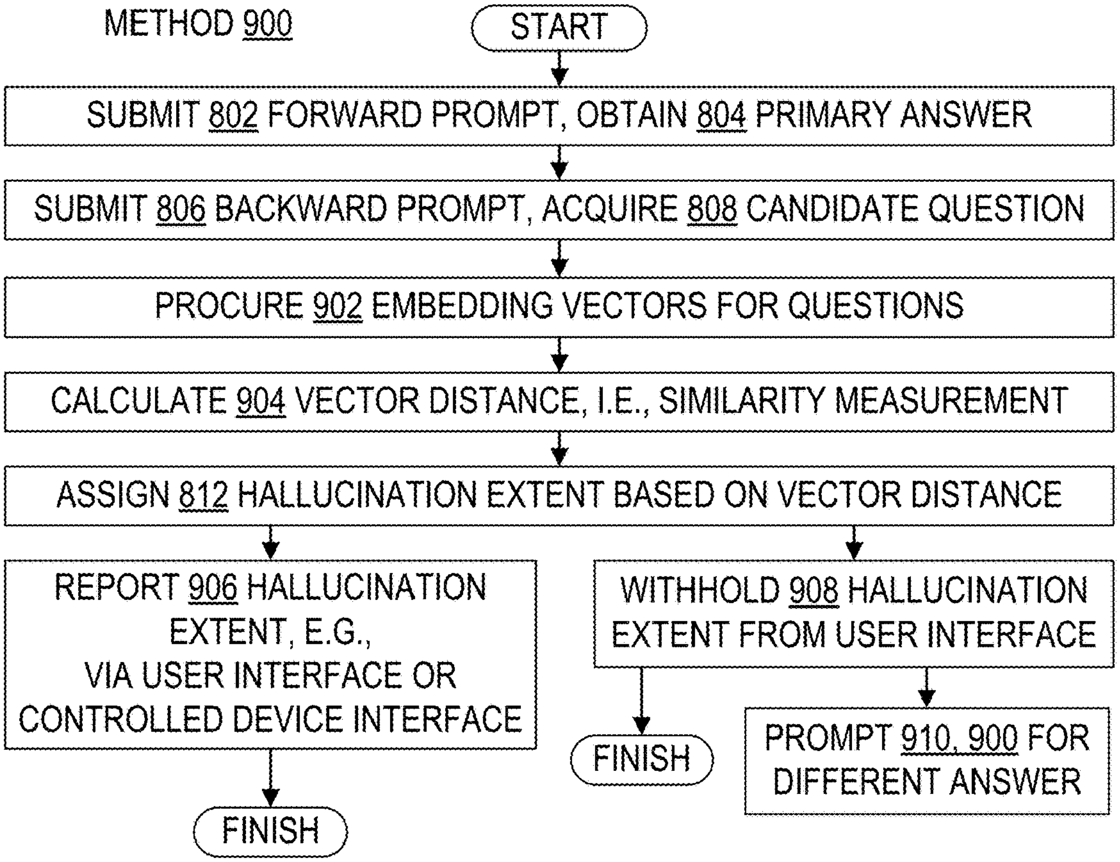

EMBED 1002 IN MODEL SPACE AS A VECTOR

LIMIT 1004 USAGE OF UNACCEPTABLE MODEL ANSWERS

DERIVE 1006 ANSWER-QUESTION PAIR

CHANGE 1008 PAIRS ORDER

MAINTAIN 1010 DATA AS NOT HUMAN-PERCEPTIBLE

GLEAN 1012 SUBSTITUTE QUESTION FROM PRIMARY Q

COMPARE 1014 VECTOR DISTANCE TO THRESHOLD

CONTROL 1016 A DEVICE BASED ON MODEL ANSWER

VARY 316 MODEL PARAMETER SETTING

VARY 320 BACKWARD MODEL SET MEMBER(S)

REPHRASE 322 WHEN DERIVING ANSWER-QUESTION PAIR

ASCERTAIN 1018 ANSWER ACCEPTABILITY STATUS

LIMIT 1020 LOOPING 1022 FOR A BETTER ANSWER

DETERMINE 1024 VERACITY OF ANSWER INDEPENDENTLY

ANY OTHER STEP 1026 TAUGHT IN TEXT OR DRAWINGS

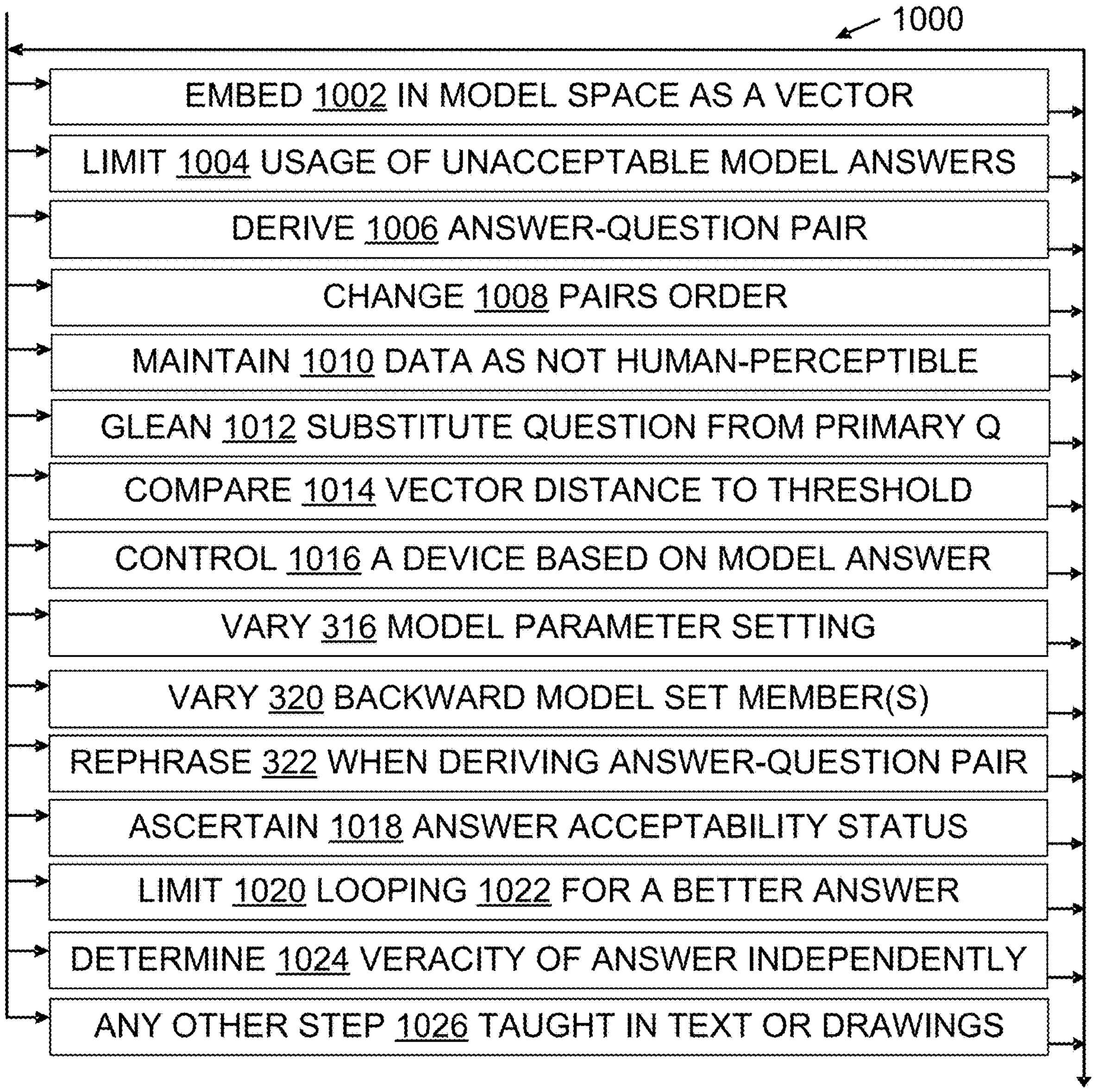

Fig. 10

Algorithm 1: Hallucination Detection

Input: $Q$, $F_{LLM}$, $B_{LLM}$, $M_{embedding}$, $\{(q^{(i)}, a^{(i)})\}_{i=1}^{n}$, $\tau$

Output: True if the generated answer is an hallucination, False otherwise

Step 1: Query Forward Pass

$\mathcal{P}_{forward} = q_1, a_1, \ldots, q_n, a_n$ $A^* = F_{LLM}([\mathcal{P}_{forward}; Q])$

Step 2: Query Reconstruction

$\mathcal{P}_{backward} = a_1, q_1, \ldots, a_n, q_n$ $Q^* = \{\}$ for $i = 1$ to $K$ do

Substep 1: Reverse Pass

$Q^* = Q^* \cup B_{LLM}([\mathcal{P}_{backward}; A^*])$

Step 3: Text Embedding

$Q_{vec} = M_{embedding}(Q)$ $Q^*_{vec} = \{M_{embedding}(q^*) : \forall q^* \in Q^*\}$

Step 4: Verification

$\text{sim}(Q, Q^*) = \underset{\forall q^*_{\text{vec}} \in Q^*_{\text{vec}}}{\text{AVG}}([C(Q_{\text{vec}}, q^*_{\text{vec}})])$ if $sim(Q, Q^*) \geq \tau$ then return *False* else return *True*

Fig. 11

$$P_i = \frac{e^{z_i/T}}{\sum_{j=1}^{N} e^{z_j/T}} \quad (5)$$

Fig. 12

$$T_i = T_0 + \frac{1.0 - T_0}{K} \cdot i \quad (6)$$

Fig. 13

$$\mathrm{sim}(Q, Q^{*}) = \underset{\forall q^{*}_{\mathrm{vec}} \in Q^{*}_{\mathrm{vec}}}{\mathbf{AVG}} \left( \left[ C\left(Q_{\mathrm{vec}}, q^{*}_{\mathrm{vec}}\right) \right] \right) \quad (7)$$

Fig. 14

$$C(u, v) = \left( \frac{u \cdot v}{\|u\| \, \|v\|} \right) \quad (8)$$

Fig. 15

LANGUAGE MODEL HALLUCINATION DETECTION

BACKGROUND

A language model is a computational mechanism for generating data based on probabilities. A given language model is trained on data, such as digital images, digital sound files, and other kinds of data, often including text data. Text data is sometimes written in one or more natural languages, such as Arabic, Chinese, English, French, German, Greek, Hebrew, Hindi, Japanese, Korean, Russian, Spanish, and so on. Some language models are trained on text that includes programming language source code. However, despite the term "language", language models are not limited to language inputs or language outputs; inputs or outputs or both may also or instead be images, sensor data, recordings of natural or artificial phenomena, or other data that is not typically described as examples of language.

Early language model technology was based largely or entirely on statistics, e.g., relative weights or likelihoods of certain text or image fragments. Statistical models were followed by recurrent neural network-based models, which were followed in turn by transformers, feedforward neural networks, and so-called "large" language models. Other language model technologies are also known, under development, or likely to emerge over time. Some language models combine two or more of these technologies, or include other computational technologies, or do both.

Language models can be useful for computational tasks such as machine translation between natural languages, generation of text in natural languages, generation of source code text in programming languages, device control, image generation, information retrieval, information classification, information summarization, and many other computational tasks that involve communication efforts in written or spoken or other form. The capabilities of many language models depend at least in part on the training data which is used to train the model in question. The training data is embedded into the language model in an encoded form, so that more training on a given topic tends to produce a model which performs better on that topic than another language model which is less well trained on the topic.

However, despite advances, language models sometimes produce undesirable, irrelevant, or insufficient results. Accordingly, improvements in technical areas involving language models would be beneficial.

SUMMARY

Some embodiments address technical challenges arising from efforts to improve the detection of hallucinations that are produced by language models. For instance, one challenge is that some hallucination detection approaches not suggested and taught here require a comparison of each language model output to a separately retrieved context from a data search or an internet search. Another challenge is that some hallucination detection approaches require examination of a language model's internal state. A third challenge is that some hallucination detection approaches are limited to assessing language model output in a particular subject matter domain. A fourth challenge is that some hallucination detection approaches are limited to assessing language models that have a particular language model architecture.

In some embodiments taught and suggested for use herein, a language model is executed with a few-shot learning forward prompt, yielding a primary answer from a primary question. This is a forward traversal. Next, a backward traversal yields candidate questions in response to a few-shot learning backward prompt which is derived from the forward prompt by reversing question-answer pairs. The backward prompt includes the primary answer but not the primary question. The backward traversal is performed through a set of one or more language models which does not necessarily include the forward traversal's language model. Finally, an embedding space distance is calculated between at least some of the candidate questions and the primary question. The larger the distance is (i.e., the less similar the candidate questions are to the primary question), the more likely it is that the primary answer includes hallucination content.

In some example embodiments taught herein, an embodiment submits a forward prompt, the forward prompt including at least one question-answer pair and a primary question, the question-answer pair including a question and a corresponding answer to the question, the primary question not accompanied in the forward prompt by a corresponding answer to the primary question. In response to the forward prompt, this example embodiment obtains a primary answer. Then this embodiment submits at least one backward prompt, each backward prompt including at least one answer-question pair and the primary answer, the answer-question pair derived from the question-answer pair by at least a pair component order reversal of the question-answer pair question relative to the question-answer pair corresponding answer, the primary answer not accompanied in the backward prompt by the primary question. In response to the backward prompt, the embodiment acquires at least one candidate question. The embodiment procures a primary question embedding vector from the primary question, and procures a respective candidate question embedding vector from each candidate question. Then the embodiment calculates a vector similarity measurement between the primary question embedding vector and at least one candidate question embedding vector, and assigns a hallucination extent to the primary answer based on at least the vector similarity measurement. One or more computational actions are then taken, based on the hallucination extent.

Beneficially, many embodiments taught herein can be used together with output veracity verification based on separately retrieved context, but they do not require it in order to detect probable hallucinations. Embodiments taught herein also operate effectively without examination of any language model's internal state, and without being constrained to a particular subject matter domain or a particular language model architecture.

Other technical activities, technical characteristics, and technical benefits pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

FIG. 4 is a block diagram illustrating some aspects of some language model hallucination detection embodiments;

FIG. 8 is a flowchart further illustrating a family of language model hallucination detection methods;

FIG. 9 is a flowchart further illustrating another family of language model hallucination detection methods;

FIG. 10 is a flowchart further illustrating language model hallucination detection methods, and incorporating as options the steps of FIGS. 5 through 9;

FIG. 11 is a pseudocode representation of an algorithm for language model hallucination detection;

FIG. 12 is a formula representation of a computational softmax function that transforms a vector into a probability distribution;

FIG. 13 is a formula representation of an incremental language model temperature parameter adjustment function;

FIG. 14 is a formula representation of a language model question vectors similarity measurement function; and FIG. 15 is a formula representation of a language model vector similarity metric function.

DETAILED DESCRIPTION

Overview

Figure 1:
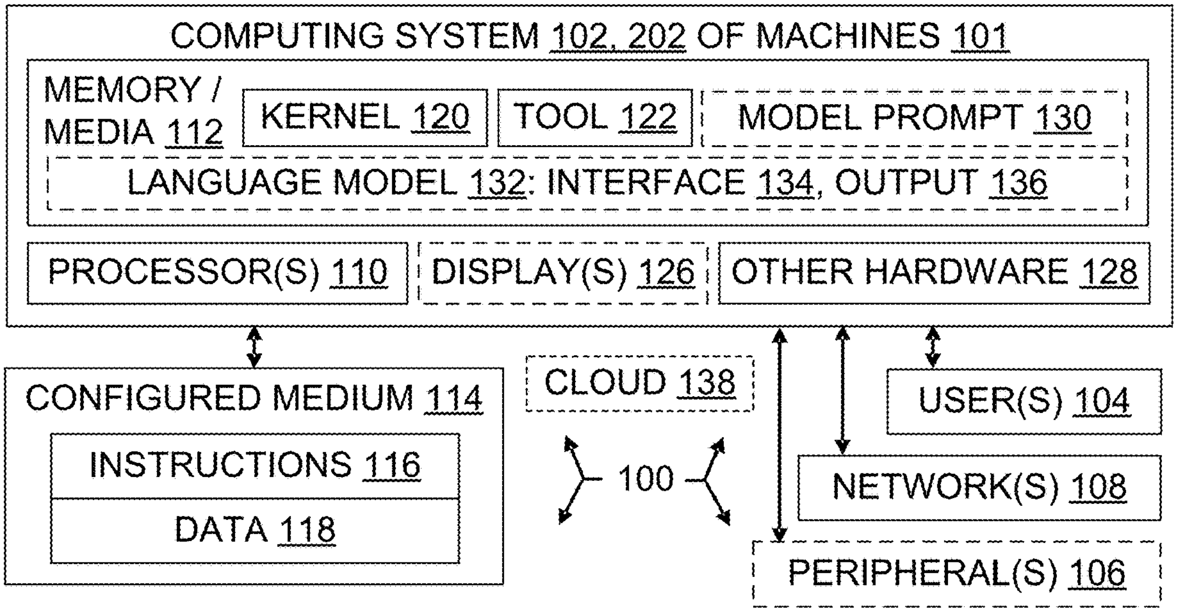
FIG. 1 is a diagram illustrating aspects of computer systems and also illustrating configured storage media, including some aspects generally suitable for embodiments which include or use language model hallucination detection functionality.

Some teachings described herein were motivated by technical challenges faced and insights gained during efforts to improve technology for language model hallucination detection. In particular, challenges were faced and insights were gained during efforts to improve internal support for some customer relationship management (CRM) tools, including a CRM update tool and a CRM search tool. The CRM update tool includes a language model which predicts whether an email discusses a project closing date or an estimated revenue or both. A hallucination occurs, for example, when the CRM update tool's language model outputs a specific date or a specific revenue number even though the underlying email does not include a specific date or a specific revenue number. The CRM search tool includes a language model which generates a structured query language (SQL) query from a natural language query. A hallucination occurs, for example, when the CRM search tool's language model outputs syntactically correct SQL code whose semantics do not match the natural language query. For instance, upon execution the SQL code would retrieve a total revenue projection for all projects but the natural language query was "Show me total projected revenue for all Q3 projects". These challenges and insights provided some motivations, but teachings herein are not limited in their scope or applicability to these particular tools, motivational challenges, or insights.

Some embodiments described herein utilize or provide technology which performs a method of language model hallucination detection. The method includes submitting a forward prompt to a first language model in a computing system, the forward prompt including at least one question-answer pair and a primary question, the question-answer pair including a question and a corresponding answer to the question, the primary question not accompanied in the forward prompt by a corresponding answer to the primary question; in response to submitting the forward prompt, obtaining a primary answer generated by the first language model; submitting a backward prompt to a backward language model set in the computing system, the backward prompt including at least one answer-question pair and the primary answer, the answer-question pair derived from the question-answer pair by at least a pair component order reversal of the question-answer pair question relative to the question-answer pair corresponding answer, the primary answer not accompanied in the backward prompt by the primary question; in response to submitting the backward prompt, acquiring at least one candidate question generated by the backward language model set; getting a digital vector similarity measurement between a primary question embedding vector which is computationally procured from the primary question, and a candidate question embedding vector which is computationally procured from at least the candidate question; and assigning a digital hallucination extent to the primary answer based on at least the digital vector similarity measurement, the digital hallucination extent assigned without any recourse to a retrieved context of verified answers and without using any input which represents human review of either the primary answer or the digital vector similarity measurement.

Figure 2:
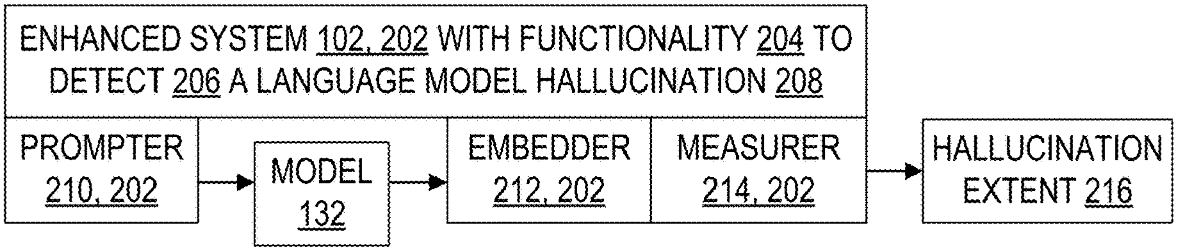
FIG. 2 is a block diagram illustrating aspects of a family of enhanced systems which are each configured with language model hallucination detection functionality.

This language model hallucination detection functionality has several technical benefits. First, it can be used together with model output veracity verification based on separately retrieved context, but the functionality does not require an external source of ground truth in order to detect probable hallucinations. Second, this language model hallucination detection functionality operates effectively without any examination of any language model's internal state; it uses model inputs and outputs instead, so access into any model's internal state is not necessary. All of the models utilized are treated by the hallucination detection functionality as block boxes. Third and fourth, this language model hallucination detection functionality is not constrained to a particular subject matter domain or a particular language model architecture. As depicted in FIG. 2, different language models 132 can be plugged into a language model hallucination detection functionality framework for testing. In effect, the language model hallucination detection functionality is configured as a testing jig which is suitable for testing the veracity of any language model.

Some embodiments described herein utilize or provide language model hallucination detection technology wherein a processor is configured to ascertain, based on at least a comparison of a hallucination extent to a threshold, that a primary answer is unacceptable, and in response to withhold the primary answer from a user interface. This has the technical benefit of improving the accuracy of the group of language model outputs that are presented via the user interface. Improving outputs accuracy helps increase confidence in the outputs and in the underlying model-based technology that creates the outputs, which in turn promotes wider and more varied use of language models in different problem domains, with accompanying productivity and ease-of-use benefits.

Some embodiments described herein utilize or provide language model hallucination detection technology wherein a processor is configured to ascertain, based on at least a comparison of a hallucination extent to a threshold, that a primary answer from a forward language model interface is unacceptable, and in response to prompt through the forward language model interface for a different answer. This has the technical benefit of improving the accuracy of language model outputs. Improving outputs accuracy helps increase confidence in the outputs and in the underlying model-based technology that creates the outputs, which in turn promotes wider and more varied use of language models in different problem domains. Another benefit is reduced or eliminated use of unacceptable outputs, which helps reduce device control errors, financial errors, and other problems.

Some embodiments described herein utilize or provide language model hallucination detection technology wherein a system is configured to submit a sequence of backward prompts at different settings of a language model parameter, and the language model parameter is one of: temperature, top-k, or top-p. Based on internal testing of dynamic temperature adjustments with a prototype, this has the technical benefit of improving the accuracy of language model hallucination detection when the model parameter is temperature. This beneficial variation of model parameters also builds on a relationship in at least some models between top-k or top-p, sampling, and model output diversity.

Some embodiments described herein utilize or provide language model hallucination detection technology wherein a system is configured to submit the backward prompt to a backward language model set which includes multiple language models. This has the technical benefit of improving the accuracy of language model hallucination detection, based on internal testing of prototypes using one or multiple language models each for a backward traversal portion of language model hallucination detection.

Some embodiments described herein utilize or provide language model hallucination detection technology wherein language model output is used to control a device. In some of these embodiments, the model output has a hallucination extent, the hallucination extent is compared to an acceptability threshold, and only a limited amount of unacceptable model output (possibly none) is actually used to control the device. This has the technical benefit of preventing device control actions (or inactions) from occurring in response to hallucinations, or at least reducing the risk that device control will occur in response to hallucinations (depending on the extent of the limited amount).

These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 138. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 138 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, language model hallucination detection functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, devices, data structures, kinds of data, settings, parameters, components, computational resources, programming languages, tools, workflows, or algorithm implementations, or other items in a computing environment, which are disclosed herein but not associated with a particular reference numeral herein. Corresponding drawings may also be added.

More about Systems

FIG. 2 illustrates a computing system 102 configured by one or more of the language model hallucination detection functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
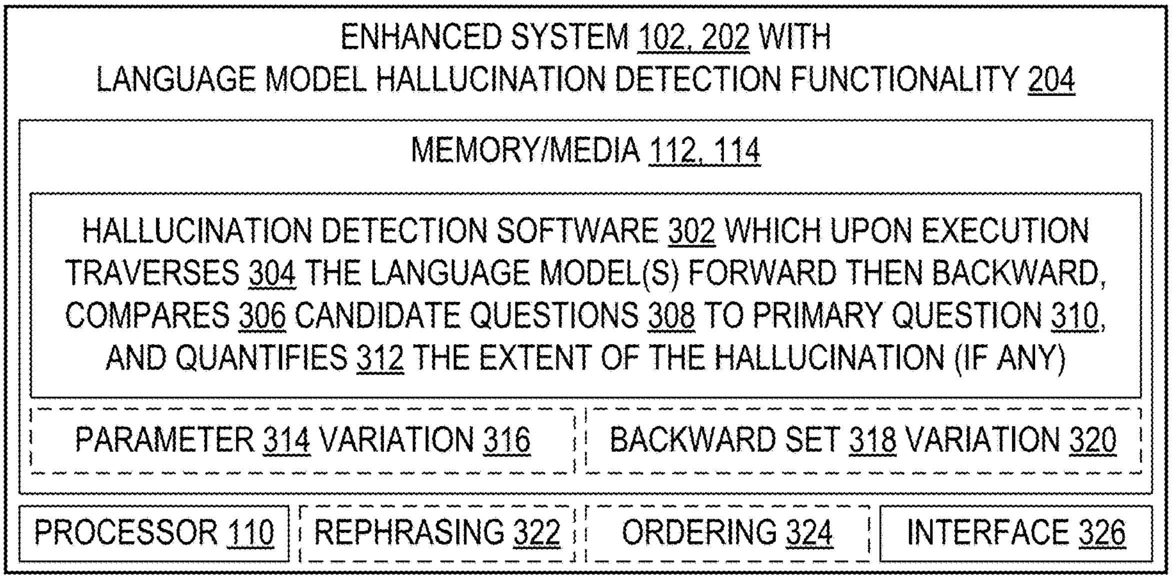
FIG. 3 is a block diagram illustrating aspects of another family of systems which are each enhanced with language model hallucination detection functionality.

FIG. 3 shows some aspects of some enhanced systems 202. Like FIG. 2, FIG. 3 is not a comprehensive summary of all aspects of enhanced systems 202 or all aspects of language model hallucination detection functionality 204. Nor is either figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

FIG. 4 shows some aspects of language model hallucination detection and some related items or processes. This is not a comprehensive summary of all aspects of language model hallucination detection. FIG. 4 items are discussed at various points herein, and additional details regarding them are provided in the discussion of a List of Reference Numerals later in this disclosure document.

Figure 5:
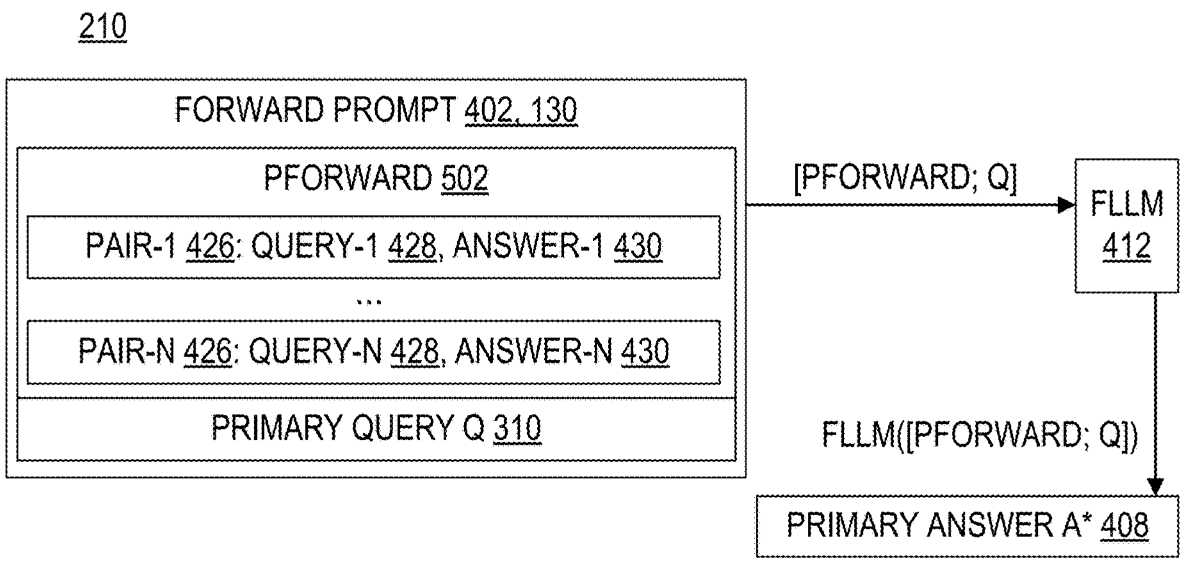
FIG. 5 is a data flow diagram illustrating forward traversal in a language model hallucination detection method or system.
Figure 6:
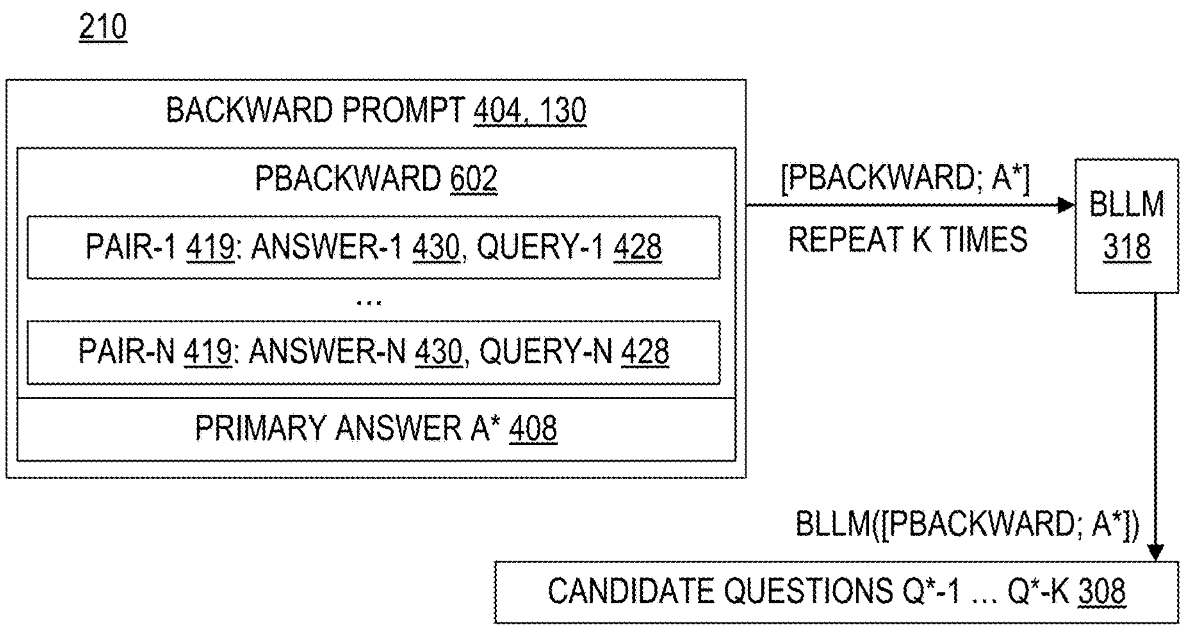
FIG. 6 is a data flow diagram illustrating backward traversal in a language model hallucination detection method or system.
Figure 7:
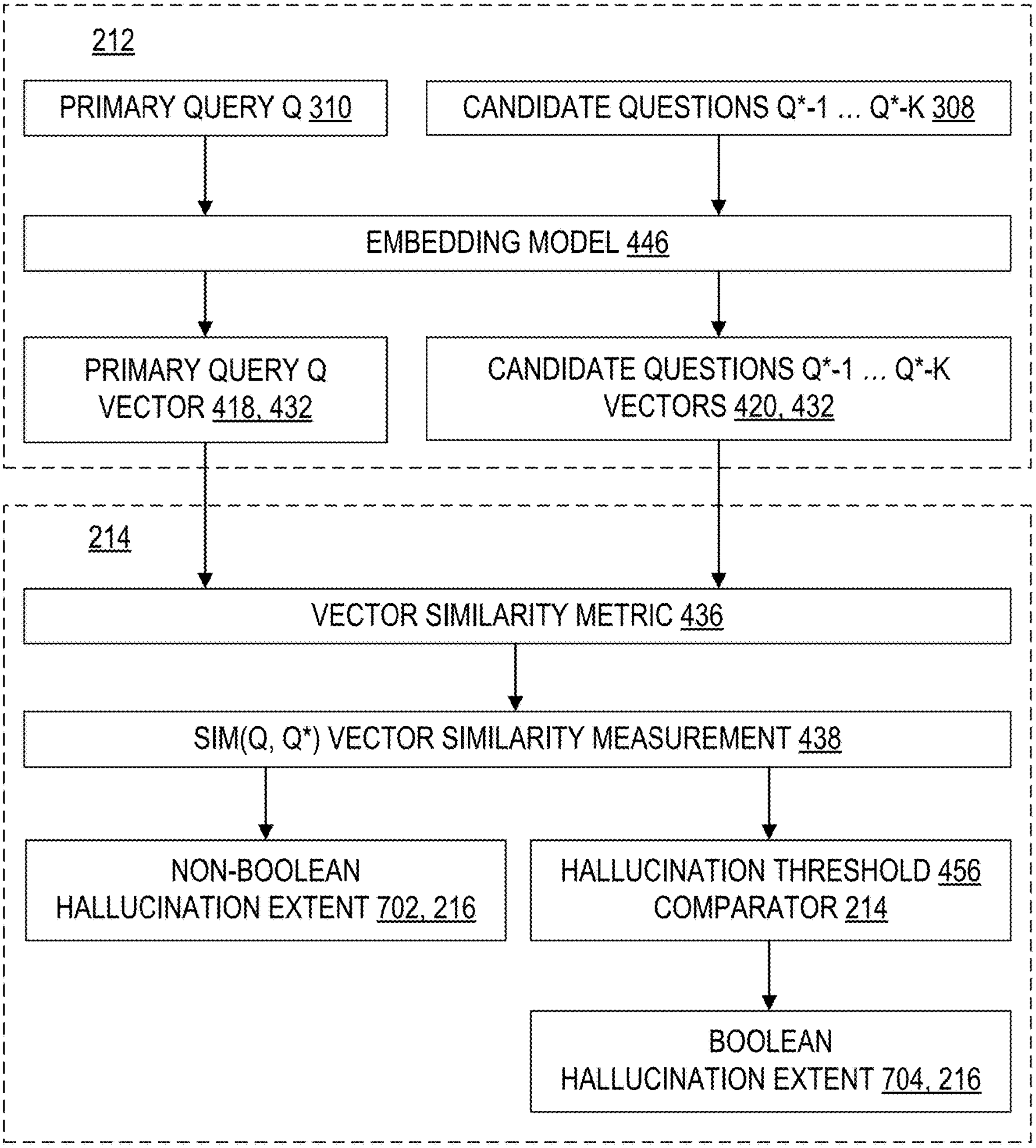
FIG. 7 is a data flow diagram illustrating vector embedding and question vectors similarity measurement in a language model hallucination detection method or system.

The other figures are also relevant to systems 202. FIGS. 5 to 7 are dataflow diagrams for some language model hallucination detection system 202 architectures, FIGS. 8 to 10 are flowcharts which illustrate methods of language model hallucination detection functionality 204 operation in some systems 202, FIG. 11 is pseudocode of a language model hallucination detection algorithm operable in some systems 202, and FIGS. 12 to 15 are formulas representing aspects of language model hallucination detection in some systems 202.

In some embodiments, the enhanced system 202 is networked through an interface 326. In some, an interface 326 includes hardware such as network interface cards, software such as network stacks, APIs, or sockets, combination items such as network connections, or a combination thereof.

Some embodiments include a computing system 202 which is configured as a language model testing framework 410. The system 202 includes a user interface 414. The system 202 also includes a digital memory set 112 including at least one digital memory 112, and a processor set 110 including at least one processor 110. The processor set is in operable communication with the digital memory set. The digital memory contains a forward language model interface 422 and a backward language model interface 424. A digital memory set is a set which includes at least one digital memory, also referred to as a memory. The word "digital" is used to emphasize that the memory is part of a computing system, not a human person's memory. The word "set" is used to emphasize that the memory is not necessarily in a single contiguous block or of a single kind, e.g., a memory may include hard drive memory as well as volatile RAM. Similarly, the phrase "processor set" is used to emphasize that a processor is not necessarily confined to a single chip.

The processor set is configured by data and instructions to perform a language model hallucination test 1000. The test includes (a) submitting 802 a forward prompt 402 to the forward language model interface 422, the forward prompt including at least one question-answer pair 426 and a primary question 310, the question-answer pair including a question 428 and a corresponding answer 430 to the question, the primary question not accompanied in the forward prompt by a corresponding answer to the primary question, (b) obtaining 804 a primary answer 408 from the forward language model interface, (c) submitting 806 a backward prompt 404 to the backward language model interface 424, the backward prompt including at least one answer-question pair 419 and the primary answer, the answer-question pair derived 1006 from the question-answer pair by at least a pair component order reversal 406 of the question-answer pair question relative to the question-answer pair corresponding answer, the primary answer not accompanied in the backward prompt by the primary question, (d) acquiring 808 at least one candidate question 308 from the backward language model interface, (e) procuring 902 a primary question embedding vector 418 from the primary question, (f) procuring 902 a candidate question embedding vector 420 from the candidate question, (g) calculating 904 a vector similarity measurement 438 between the primary question embedding vector and the candidate question embedding vector, (h) assigning 812 a hallucination extent 216 to the primary answer based on at least the vector similarity measurement, and (i) reporting 906 the hallucination extent via an interface. In an alternate phrasing, the "forward prompt" is a "first prompt", the "forward language model interface" is a "first language model interface", the "backward prompt" is a "second prompt", the "backward language model interface" is a "second language model interface", and the "backward language model set" is a "set including at least a second language model". Also, a "forward language model" is a "first language model", "set" means "non-empty set" unless expressly stated otherwise, and "based on" means "computed from at least".

One example of a forward prompt 402 is the following, which includes two question-answer pairs 426 followed by a primary question 310:

Question: "What is the capital of France?"
Answer: "The capital of France is Paris."
Question: "What is the capital of Japan?"
Answer: "The capital of Japan is Tokyo."
Question: "What is the capital of Israel?"

Assume a forward traversal of a model 412 in response to this forward prompt yields a primary answer 408 "The capital of Israel is Tel Aviv." The capital of Israel is actually Jerusalem, when "capital" means a geopolitical capital such as Paris or Tokyo, so this primary answer includes a hallucination 208. Although this example forward prompt has two question-answer pairs for few-shot learning, some variations include a single question-answer pair or more than two question-answer pairs.

An example of a corresponding backward prompt 404, which has answer-question pairs 419 corresponding to the forward prompt's question-answer pairs 426 plus the primary answer, is:

Answer: "The capital of France is Paris."
Question: "What is the capital of France?"
Answer: "The capital of Japan is Tokyo."
Question: "What is the capital of Japan?"
Answer: "The capital of Israel is Tel Aviv."

Although this example backward prompt 404 has the same number of answer-question pairs as the number of question-answer pairs in the forward prompt above, some variations include fewer pairs in the backward prompt than in the forward prompt. Also, some variations change 1008 the order of the pairs.

Assume a backward traversal of a model set 318 in response to this backward prompt yields a candidate question 308 "What is the startup capital of Israel?". In general, the backward traversal model 318 could be the same as the forward traversal model 412, or it could be a different model 132. In this example the same model 132 serves both as the forward traversal model 412 and as the backward traversal model 318. Embedding the candidate question 308 in an embedding space 446 yields a candidate question vector 420, and embedding the primary question 310 in the embedding space 446 yields a candidate question vector 420. Suitable embeddings 446 include, e.g., ada-002, Davinci, jina-embeddings-V2, and others provided through commercially available embedding tools or specifications. The questions 308 and 310 are different, so their vectors 432 will be different, and a measurement 438 of distance between their vectors under a vector similarity metric 436 will be non-zero.

Finally, an embodiment assigns 812 a hallucination extent 216 computed from at least the vector distance measurement 438. The assignment is done in different ways, depending on the embodiment or circumstances such as a configuration setting 460, or both. In some cases, the vector distance measurement 438 is also the hallucination extent 216; this is an example of a non-Boolean hallucination extent 216, 702, because vector distance measurements are values of data type real or float. In some cases, the vector distance measurement 438 is compared 1014 to a specified threshold 456, and if the distance is less than or equal to the threshold then the hallucination extent 216 (which is of data type Boolean 704) is assigned value TRUE meaning no hallucination, and otherwise the Boolean hallucination extent 216, 704 is assigned value FALSE meaning a hallucination was detected. The meaning of TRUE and FALSE will be defined in a given embodiment. Thus, in a variation TRUE means there is a hallucination and FALSE means no hallucination.

In the particular example at hand, the threshold is zero. Because the vector distance measurement 438 is greater than zero (due to the word "startup" being in the candidate question but not in the primary question), the hallucination extent is assigned the value FALSE meaning the primary answer is false, i.e., the primary answer includes some hallucinated content 208. In a variation, the functionality 204 does not compare the vector distance measurement 438 to a threshold but instead reports 906 the vector distance measurement 438 itself, or a scaled version of the distance, as the hallucination extent 216, 702.

In some embodiments, the computing system 202 includes at least one of: the forward language model interface 422 interfaces with a forward language model 412, and the system 202 includes the forward language model; the backward language model interface 424 interfaces with a backward language model set 318, the system 202 includes the backward language model set, and the backward language model set 318 includes the forward language model 412; the backward language model interface interfaces with a backward language model set, the system 202 includes the backward language model set, and the backward language model set does not include the forward language model; the backward language model interface interfaces with a backward language model set 318 which includes multiple language models 132, and the system 202 includes the backward language model set; the backward language model interface interfaces with a backward language model set which includes exactly one language model (it may include components in addition to that model but does not include more models), and the system 202 includes the backward language model set; a single application program interface 134 serves as both the forward language model interface 422 and as the backward language model interface 424; or a first application program interface 134 serves as the forward language model interface 422 and a second different application program interface 134 serves as the backward language model interface 424.

In other words, models 132 may be utilized in various ways. For example, one, two, or more models 132 are part of some systems 202, while other systems 202 interface with one or more models 132 but do not themselves include such models so far as claim scope is concerned. Also, the forward model 412 is sometimes also part (or all) of the backward model set 318, but not in every embodiment. Also, the backward model set 318 includes one or more models 132, depending on the embodiment. Including two or more models in the backward model set beneficially improves the accuracy of hallucination detection, at the cost of additional computation.

In some embodiments, the computing system 202 is configured to submit 806 a sequence 468 of backward prompts 404 to the backward language model interface 424, to acquire 808 a corresponding sequence 468 of candidate questions 308 from the backward language model interface, to procure 902 a corresponding sequence 468 of candidate question embedding vectors 420, and to calculate 904 the vector similarity measurement 438 computed from at least at least the primary question embedding vector 418 and the candidate question embedding vectors 420.

In particular, some embodiments calculate 904 the distance 438 between the primary question 310 (denoted Q) and the candidate questions 308 (denoted Q*) in a computation which implements Formula (7) shown in FIG. 14. Formula (7) references a similarity metric 436 (denoted C) which implements Formula (8) shown in FIG. 15. These formulas are discussed in detail later in the present disclosure.

A technical advantage of employing multiple candidate questions 308 instead of only a single candidate question 308 is realized when variations result in different candidate questions 308, yielding more data points (n-dimensional vectors 432) for the similarity distance calculation 904, which tends to increase the accuracy of the hallucination detection. Depending on the embodiment or configuration or both, variations utilized to generate different candidate questions 308 include variations 320 which correspond to different models 132 within the backward language model set 318, variations 316 which correspond to different model parameters 314, or both.

In some embodiments, the computing system 202 is configured to submit 806 the sequence 468 of backward prompts 404 at different settings 460 of a language model parameter 314, and the language model parameter is one of: temperature 440, top-k 444, or top-p 442. In some embodiments, two of the parameters 314 are varied 316, and in some embodiments, all three of the parameters 314 are varied 316.

In some of these embodiments, the system is configured to submit the sequence of backward prompts at different settings of a language model parameter which differ from one another by integer multiples of an increment 474; this is referred to herein as incremental variation 316. In some embodiments, incremental variation 316 is performed by a computation corresponding to Formula (6) shown in FIG. 13 for the parameter temperature, or by a computation corresponding to an analogous incremental variation formula (not shown) for parameter top-k or parameter top-p. In other embodiments, variation 316 is performed randomly or quasi-randomly instead of being performed incrementally.

In some embodiments, the computing system 202 is configured to ascertain 1018, computed from at least a comparison 1014 of the hallucination extent 216 to a threshold 456, that the primary answer 408 is unacceptable (e.g., acceptability status 458 is "not acceptable"). Depending on the embodiment or configuration or both, additional computational actions then occur in response to the answer's non-acceptability.

In some cases, the system 202 withholds 908 the unacceptable primary answer from the user interface. This has the benefit of sparing human users from spending time and effort dealing with hallucinations, thereby increasing human productivity, and reducing use of computational resources to display and further process unacceptable answers. Indeed, except for developers or quality control testers who access normally hidden data, the human users are not presented with the hallucinated answer 408, do not perceive the hallucinated answer 408, and do not even know the hallucinated answer 408 existed. As a result, computational processes which include withholding 908 a generated answer 408 are clearly not processes that can be performed solely in a human person's mind or solely with pen and paper. One aspect of such processes is that, by definition, humans do not perceive the withheld data.

In some cases, the system 202 responds to the unacceptable primary answer by prompting 910 through the forward language model interface for a different answer 476. Prompting 910 for a different answer 476 is an attempt to obtain an acceptable answer, or at least a better answer. Such prompting 910 does not typically occur via a forward prompt 402, or even via some other few-shot prompt 130, although these kinds of prompting are permitted or required in some embodiments or configurations.

In one scenario, the system displays the unacceptable answer instead of withholding 908 it, together with a remark such as "Here's an answer, but it may be wrong so another answer is also being generated. Please wait a moment." In some situations, the answer's distance 438, or a scaled version thereof, is also displayed as a confidence level associated with the answer 430.

In another scenario, the system withholds 908 the unacceptable answer and goes into a loop 1022 that seeks a better answer. One such loop includes prompting 910 for an answer, testing that answer for acceptability via backward traversal 304 to acquire 808 candidate questions, embedding 1002 questions into vectors, measuring vector distance 438, and threshold comparison 1014, as discussed elsewhere herein. These systems exit the loop 1022 after (a) obtaining an acceptable answer (or in some cases, obtaining an answer that is at least better because the answer's distance 438 is smaller), or (b) reaching a defined limit on looping. Looping for a better answer is limited 1020 in some scenarios, e.g., based on a max number of loop iterations, a max amount of all clock time spent looping, or a max amount of a computational resource (processor cycles, network bandwidth, electricity, etc.) expended on loops.

In some cases, the system 202 limits 1004 usage of unacceptable answers. For example, in some embodiments the system 202 is configured to control 1016 a device 478 using acceptable answers without using 1004 more than a permitted amount 421 of unacceptable answers 430. The permitted amount 421 is defined, e.g., as a max total number of unacceptable answers 430, a max rate of unacceptable answers 430 per time period, or a max cumulative distance 438 of unacceptable answers 430. An answer produced by a model is acceptable, e.g., when the hallucination extent associated with the answer is less than or equal a specified threshold; otherwise the answer is unacceptable. Answers deemed unacceptable 458 but not forwarded to a user interface 414 or a device 478 control interface do not count against the usage amount 421. Limiting 1004 the usage of unacceptable answers has the benefit of limiting the potential risk, damage, expense, or loss of goodwill caused by reliance on unacceptable answers. In some scenarios, for example, the controlled device 478 includes at least one of: a vehicle, a robot, a communications device 101 in a network 108, a wearable computing device 101, an internet of things device, a smart phone, or a device configured for game play.

In some cases, the system 202 limits 1004 usage of unacceptable answers of particular data type(s) 425. For example, in some embodiments the system 202 is configured to send generated output 136 to a user interface 414 or a device 478 control interface 326 using acceptable answers without using 1004 more than a specified amount 421 of unacceptable answers. Limiting 1004 the usage of unacceptable answers also beneficially limits the potential harm caused by reliance on unacceptable answers when particular data types are of interest. For example, in some scenarios the generated output includes at least one of: a natural language text 480, a source code text 484, a portion of an image 486, a portion of a video clip 488, a portion of an audio clip 490, a portion of a sensor data clip 492, or a portion of an industrial control sequence 423. In some variations, a user selects a displayed output, and as a result the selected output is employed for further computation. In some situations in a software development tool, for instance, user selection of a model-generated source code output results in the selected source code being entered as part of a program source code in a file being edited.

Other system embodiments are also described herein, either directly or derivable as system versions of described processes or configured media, duly informed by the extensive discussion herein of computing hardware.

Although specific language model hallucination detection architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of language model hallucination detection functionality, for example, as well as different machine learning or other artificial intelligence technical features, aspects, mechanisms, software, expressions, operational sequences, commands, data structures, programming environments, execution environments, environment or system characteristics, proxies, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 8, 9, and 10 each illustrate a family of methods 800, 900, and 1000 respectively, which are performed or assisted by some enhanced systems, such as some systems 202 or another language model hallucination detection functionality enhanced system as taught herein. Method families 800 and 900 are each a proper subset of method family 1000. Moreover, data flow diagrams in FIGS. 5, 6, and 7 include method steps, e.g., submitting 802 forward prompt [PFORWARD; Q] to FLLM 412, obtaining 804 primary answer A*, embedding 1002 questions into embedding model 446, acquiring 808 candidate questions, and so on. These method steps are likewise incorporated into method (a.k.a. process) 1000. These diagrams and flowcharts are merely examples; as noted elsewhere, any operable combination of steps that are disclosed herein may be part of a given embodiment when called out in a claim.

FIGS. 1 to 7 and FIGS. 11 to 15 also illustrate aspects of language model hallucination detection system 202 architectures with implicit or explicit actions, e.g., connecting a model 132 to interfaces of a prompter 210 and an embedder 212 per the FIG. 2 architecture, connecting one or more models 132 to interfaces to form a BLLM 318 per the FIG. 6 architecture, formulating a prompt 130, selecting a threshold 456, and selecting an increment 474, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks in natural language an input such as a primary question 310, which is captured in the system 202 as digital audio and then converted to digital text. Natural language means a language that developed naturally, such as English, French, German, Hebrew, Hindi, Japanese, Korean, Spanish, etc., as opposed to designed or constructed languages such as HTML, Python, SQL, or other programming languages. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 10. FIG. 10 is a supplement to the textual and figure drawing examples of embodiments provided herein and the descriptions of embodiments provided herein. In the event of any alleged inconsistency, lack of clarity, or excessive breadth due to an interpretation of FIG. 10, the content of this disclosure shall prevail over that interpretation of FIG. 10.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1000 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 10 to be non-operable, the sequence S is not within the scope of any claim. Any assertion otherwise is contrary to the present disclosure.

Some embodiments provide or utilize a standalone language model hallucination detection method 1000. This method is "standalone" in the sense that it produces a measurement 438 quantifying a likelihood that a language model 132 produced an answer 430 containing a hallucination 208 based on interactions with the language model in a manner that is independent of any internet search, database search, or other retrieved context 448 that confirms or contradicts the veracity of the answer.

This standalone language model hallucination detection method includes automatically: submitting 802 a forward prompt to a first language model in a computing system, the forward prompt including at least one question-answer pair and a primary question, the question-answer pair including a question and a corresponding answer to the question, the primary question not accompanied in the forward prompt by a corresponding answer to the primary question; in response to submitting the forward prompt, obtaining 804 a primary answer generated by the first language model; submitting 806 a backward prompt to a backward language model set in the computing system, the backward prompt including at least one answer-question pair and the primary answer, the answer-question pair derived 1006 from the question-answer pair by at least a pair component order reversal of the question-answer pair question relative to the question-answer pair corresponding answer, the primary answer not accompanied in the backward prompt by the primary question; in response to submitting the backward prompt, acquiring 808 at least one candidate question generated by the backward language model set; getting 810 a digital vector similarity measurement between a primary question embedding vector which is computationally procured 902 from the primary question, and a candidate question embedding vector which is computationally procured 902 from at least the candidate question; and assigning 812 a digital hallucination extent to the primary answer computed from at least the digital vector similarity measurement, the digital hallucination extent assigned without any recourse to a retrieved context 448 of verified answers 450 and without using any input 452 which represents human review 454 of either the primary answer or the digital vector similarity measurement. An embedding vector is computationally procured by tokenizing a question and inputting the tokens to an encoder such as ada-002, jina-embeddings v2, or any other text embedding model. Although a question will typically include text, a question also includes other kinds of data in some situations, such as image data, sound data, video data, or sensor data that the text of a question refers to, or non-text data which otherwise provides meaningful context to the text of a question. Hence, models for embedding non-text data are also used in some cases.

In some embodiments, the method 1000 includes at least one of: submitting 806 the backward prompt to the backward language model set multiple times at varied 316 temperature settings, and basing the digital hallucination extent on at least two candidate questions which were generated at different temperature settings; submitting 806 the backward prompt to the backward language model set multiple times at varied 316 top-k settings, and basing the digital hallucination extent on at least two candidate questions which were generated at different top-k settings; or submitting 806 the backward prompt to the backward language model set multiple times at varied 316 top-p settings, and basing the digital hallucination extent on at least two candidate questions which were generated at different top-p settings. In this context, basing X on Y means computing X from at least Y.

In some embodiments, the method 1000 includes deriving 1006 the answer-question pair from the question-answer pair by the pair component order reversal and also at least by automatically rephrasing 322 the question or rephrasing 322 the corresponding answer to the question, or rephrasing both. Automatic rephrasing is accomplished, e.g., by a language model in response to a prompt requesting rephrasing, by using a set of text transformation rules, by an adaptation of a spelling correction mechanism (e.g., to change "Q:" into "Question:"), by an adaption of a program language translator, by an adaptation of a natural language translator, or by a combination of such mechanisms.

For example, in some scenarios a short answer is rephrased 322 by the system 202 to more closely match the structure of the corresponding question. In one case, part of a question-answer pair 426 is rephrased to derive an answer-question pair 419 as follows:

"Q: What's the capital of Spain?"

"A: Madrid."

becomes

"A: The capital of Spain is Madrid."

"Q: What's the capital of Spain?"

As another example, in one case parts of a question-answer pair 426 are rephrased to derive an answer-question pair 419 as follows:

"Q: What's the capital of Australia?"

"A: The capital of Australia is Canberra."

becomes

"Answer is: The capital of Australia is Canberra."

"Question is: What is the capital of Australia?"

In some embodiments, the method 1000 includes changing 1008 a pairs order 324 (that is, an order of pairs), such that the backward prompt includes at least two answer-question pairs 419 which individually correspond to respective question-answer pairs 426 in the forward prompt, but the answer-question pairs appear in a different 1008 pairs order 324 in the backward prompt than the corresponding pairs in the forward prompt. In some cases, such order variation 320 improves hallucination detection accuracy.

For instance, in one case the forward prompt 402 includes two question-answer pairs 426 followed by a primary question 310:

Question: "What is the capital of England?"

Answer: "The capital of England is London."

Question: "What is the capital of China?"

Answer: "The capital of China is Beijing."

Question: "What is the capital of Canada?"

An example of a corresponding backward prompt 404, which has reordered 1008 answer-question pairs 419 corresponding to the forward prompt's question-answer pairs 426 plus the primary answer, is:

Answer: "The capital of China is Beijing."

Question: "What is the capital of China?"

Answer: "The capital of England is London."

Question: "What is the capital of England?"

Answer: "The capital of Canada is Quebec."

The reordering 1008 is random or quasi-random in some cases. The reordering 1008 is according to a specified ranking in other cases, e.g., computed from at least the frequency with which tokens in the question-answer pairs 426 occur in a set of documents.

In some embodiments, the method 1000 includes ascertaining 1018, computed from at least the hallucination extent and a threshold, that the primary answer is unacceptable; and in response to the ascertaining 1018, withholding 908 the unacceptable primary answer from display on a user interface which is configured to display output from the first language model, thereby maintaining 1010 the unacceptable primary answer solely in a digital form 466 which is not human-perceptible 464 via the user interface. This withholding 908 has the benefits discussed elsewhere herein of sparing humans from the time and effort they would otherwise spend considering the unacceptable primary answer, and conserving computational resources.

In some embodiments, the method 1000 includes ascertaining 1018, computed from at least the hallucination extent and a threshold, that the primary answer is unacceptable; and in response to the ascertaining 1018, prompting 910 the first language model for another answer to the primary question, or prompting 910 the first language model for an answer to a substitute question 462, wherein the substitute question is computationally gleaned 1012 from the primary question or the substitute question is semantically interchangeable 470 with the primary question, or both.

In some embodiments, a substitute question is computationally gleaned 1012 from a primary question by making only syntactic changes, e.g., "Q:" becomes "Question:" or vice versa, or "What's" becomes "What is" or vice versa, or capitalization is changed, or "12" becomes "twelve" or vice versa.

In some embodiments, two questions are semantically interchangeable 470 when at least one of the following semantic equivalence criteria are satisfied: (a) the questions differ from one another only by a synonym (e.g., per a dictionary lookup), (b) one question is an output from a prompt to a model asking how to say the other question differently without changing its meaning, (c) vectors corresponding to the questions are separated by no more than a specified distance which is less than 0.1 on a normalized distance scale, or (d) the questions are logically equivalent by virtue of having the same truth values.

In some cases, the primary question is actually recovered by the backward traversal, i.e., one of the candidate questions q*i is the same as the primary question Q. In this context, "same" or "equal" means differing at the most only in syntax (see above). In some scenarios, an independent verification also determines 1024 whether the primary answer includes a hallucination. If the primary question is recovered and the primary answer is free of hallucination, that generally indicates the model 132 did not hallucinate in either direction. But if the primary question is recovered and the primary answer includes a hallucination, that indicates the model 132 hallucinated in both directions.

Accordingly, in some embodiments and scenarios, the candidate question 308 equals the primary question 310, and the method 1000 further includes determining 1024 whether the primary answer is a hallucination, the determining being independent of the vector similarity measurement 438. In some cases, determining 1024 is computed from at least retrieved content 448 from an internet search or a database search, or based on human review of the answer. Each of these determination 1024 techniques is "independent" of the vector similarity measurement 438 in the sense that they do not rely on use of the measurement 438 or even rely on the existence of the measurement 438, in order to reach a conclusion about the presence of hallucinated content, if any, within the primary answer.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as forward prompts 402, backward prompts 404, hallucination detection software 302, hallucination extents 216, question vectors 418, 420, and model interfaces 422, 424, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing language model hallucination detection functionality 204 as disclosed herein. The Figures thus help illustrate configured storage media embodiments and process (a.k.a. method) embodiments, as well as system and process embodiments. In particular, any of the method steps illustrated in FIGS. 8 to 10, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 1000 of testing language model output. This method 1000 includes automatically: submitting 802 a forward prompt, the forward prompt including at least one question-answer pair and a primary question, the question-answer pair including a question and a corresponding answer to the question, the primary question not accompanied in the forward prompt by a corresponding answer to the primary question; obtaining 804 a primary answer in response to the forward prompt; submitting 806 at least one backward prompt, each backward prompt including at least one answer-question pair and the primary answer, the answer-question pair derived 1006 from the question-answer pair by at least a pair component order reversal of the question-answer pair question relative to the question-answer pair corresponding answer, the primary answer not accompanied in the backward prompt by the primary question; acquiring 808 at least one candidate question in response to the at least one backward prompt; procuring 902 a primary question embedding vector from the primary question; procuring 902 a respective candidate question embedding vector from each candidate question; calculating 904 a vector similarity measurement between the primary question embedding vector and at least one candidate question embedding vector; assigning 812 a hallucination extent to the primary answer computed from at least the vector similarity measurement; and reporting 906 the hallucination extent via a user interface or a controlled device interface or both.

In some embodiments, the primary answer belongs to a first dataset 494, and at least a portion of the method 1000 is repeated with a second dataset 494, and respective hallucination extents for the datasets are reported 906 via the user interface. Internal testing of prototypes, for example, included queries 310 from three different datasets: one dataset on movie data (e.g., title, release year, cast), one dataset on book data (e.g., author, publication year), and one dataset of countries and their geopolitical data such as capitals.

In some embodiments, the primary question includes text 482. Some examples of text 482 include natural language text 480 and source code 484.

In some embodiments, at least one of the primary question and the primary answer include source code 484.

In some embodiments, at least one of the primary question 310 and the primary answer 408 represent at least one of: a time 403, a calendar date 403, a duration 401, a location 409, an amount 496 of money, a cite 405 to a legal authority, a statement 411 of a human person or a legal person, an output 118 of a computing system 102, an action 498 of a human person or a legal person or a computing system, a human person's name 413, a legal person's name 413, a computing system identifier 407, a device 101 identifier 407, a health status 415, a legal status 415, a financial status 415, confidential or proprietary information 417, medical information 417, military information 417, national security information 417, information 417 which is subject to governmental regulation, or personal identifiable information 417.

Machine Learning Models, Including Language Models

A machine learning model 132 or other language model 132 within or utilized by an enhanced system 202 is not necessarily a large language model (LLM) in every embodiment, but it is an LLM in some embodiments. For present purposes, a language model is "large" if it has at least a billion parameters. For example GPT-2 (OpenAI), MegatronLM (NVIDIA), T5 (Google), Turing-NLG (Microsoft), GPT-3 (OpenAI), GPT-3.5 (OpenAI), GPT-4 (OpenAI), and LLAMA versions (Meta AI) are each a large language model (LLM) 132 for purposes of the present disclosure, regardless of any definitions to the contrary that may be present in the industry.

Language model stability is a consideration in some embodiments and some scenarios, e.g., for a backward traverse machine learning model 318. Instability leads to inconsistency in language model responses to prompts 130. Language model stability is sometimes dependent on language model parameters 314. Some different large language models have different stability parameters, and some exhibit different variability between answers to the same question even while using the same stability parameters. Some models 132 are stabilized by adjusting parameters 314 such as temperature, frequency penalty, presence penalty, or nucleus sampling, and also or instead by constraining the queries sent to a given instance of the model 132.

Additional Observations

Additional support for the discussion of language model hallucination detection functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

A challenge is that LLMs have problems with hallucinations. This is caused at least in part by the way the LLMs are trained, and because LLMs try to answer whatever questions they are asked. This problem hinders the adoption of LLMs in many domains.

Although mitigation can be helpful, many embodiments presented herein focus on detecting hallucinations. They interrogate the language model, asking multiple questions in different ways to see if the answer changes based on the question. Techniques taught herein detect hallucination, e.g., when the model starts to drift away from truth. Some embodiments raise a flag that says that this answer includes a hallucination. Some embodiments let the model answer for a question (a.k.a. query), then we ask the model what is the question that is likely to be associated with that answer. The model maps a question into an answer. Using the generated answer, some embodiments go back many times to the question domain and try to reconstruct the original question, without showing the model the original question.

Despite the many advances of Large Language Models (LLMs) and their unprecedented rapid evolution, their impact and integration into every facet of daily life is limited due to various reasons. One critical factor hindering their widespread adoption is the occurrence of hallucinations 208, where LLMs 132 invent answers that sound realistic, yet drift away from factual truth. The present disclosure presents embodiments configured for detecting 206 hallucinations in large language model outputs, thereby addressing an important issue in the adoption of these models in various real-world scenarios. Through discussion of extensive internal prototype evaluations across multiple datasets and LLMs, the disclosure explores hallucination levels of various recent LLMs and demonstrates the effectiveness of embodiments to automatically detect them.

One hallucination detection approach, which was referred to during internal prototype evaluation as the InterrogateLLM approach or simply as InterrogateLLM, employs a systematic evaluation of model-generated responses for potential hallucinations by utilizing repetition of a process of reconstructing a query from its generated answer. InterrogateLLM includes teachings presented herein, but the teachings (and corresponding embodiments) are not limited to InterrogateLLM.

The emergence of LLMs 132 such as GPT-3, PaLM, and Llama (a.k.a. LLaMA), among others, has revolutionized natural language processing, among other fields. These models 132 enable machines 102 to understand and generate human-like text with unprecedented fluency and coherence. These models 132, trained on vast amounts of text data, have demonstrated remarkable capabilities in various applications, from automated content generation to virtual assistants and beyond.

However, their remarkable performance comes with a set of challenges and concerns to be addressed for their responsible and effective use. A particular concern is the phenomenon of hallucination (also referred to as "fabrication") 208, whereby these language models generate misleading, potentially harmful, or erroneous output 136. Hallucination can manifest as the presence of false information in the output generated by the language model, such as information that lacks a factual basis. Due in part to hallucination, there are significant challenges associated with the deployment of large language models in real-world applications, especially in applications involving critical information or decision-making processes.

Some approaches for evaluating the veracity of model-generated text rely on surface-level metrics such as fluency and coherence, which may not be able to capture or adequately address the underlying issue of hallucinations.

One veracity evaluation approach employs a multi-layer perceptron classifier that uses hidden representations from language models to predict sentence truthfulness. However, this approach utilizes labeled data for supervised training, and access to the internal states of the language model, which may not always be readily available. Unless expressly stated otherwise herein for a particular embodiment, the embodiments taught herein do not rely on access to the internal states of the language model. Similarly, unless expressly stated otherwise herein for a particular embodiment, the embodiments taught herein do not rely on labeled data for supervised training for hallucination detection.

Some veracity evaluation approaches perform a token-level reference-free hallucination detection task along with an additional dataset designed for hallucination detection in free-form text. This dataset includes textual passages with perturbations, and an objective is to determine whether the entire passage exhibits hallucinations. Some embodiments herein differ, in that they specifically address hallucination detection with few-shot prompts involving query-answer sequences rather than relying on textual passages with perturbations.

One veracity evaluation approach involves a self-evaluation technique, where models are trained to predict their knowledge of the answer to any given free-form question. This approach entails prompting the language model to internally assess the accuracy of its previous predictions, including estimating the likelihood that its generated response or answer is correct. This approach requires labeled data for model training, making it a supervised task. As noted above, unless expressly stated otherwise herein for a particular embodiment, the embodiments taught herein do not rely on labeled data for supervised training for hallucination detection.

A SelfCheckGPT veracity evaluation approach evaluates the coherence between a response and stochastic samples by querying the same LLM multiple times. Specifically, it employs an additional prompt that includes a stochastic sample and a sentence from the generated text and predicts whether the sentence is supported by the stochastic sample. Internal testing of the InterrogateLLM utilized a SelfCheckGPT benchmark, but unless expressly stated otherwise herein for a particular embodiment, the embodiments taught herein do not rely on employing an additional prompt that includes a stochastic sample and a sentence from the generated text and on predicting whether the sentence is supported by the stochastic sample, for hallucination detection.

Accordingly, a systematic and effective technology which detects hallucinations in models' outputs would be beneficial. This disclosure presents embodiments for the detection of hallucinations in large language models. Some embodiments identify instances of hallucination in a generated text, thereby providing a more accurate and robust assessment of model behavior. Some embodiments perform hallucination detection with few-shot prompts involving query-answer sequences.

The effectiveness of various embodiments taught herein has been demonstrated through extensive internal confidential experiments across a variety of language models 132, yielding results which provided insight into the prevalence of hallucinations and their potential risks. The embodiments taught herein are not infallible. But this disclosure contributes to an ongoing dialogue about the responsible use of AI-powered language models, and to the efforts to enhance their reliability in real-world applications.

In particular, this disclosure provides contributions that include the following, among other contributions: (1) an introduction to InterrogateLLM methods designed for detecting hallucinations in textual answers generated by LLMs, (2) results of an LLM evaluation approach specifically tailored to the task of hallucination detection, with examples leveraging three datasets associated with text generation tasks, (3) results of an investigation of hallucination levels exhibited by recent LLMs, including Llama2, shedding light on their fidelity levels, and (4) performance reports on internal prototypes implementing InterrogateLLM, reflecting an in-depth comparison with alternative methods through extensive internal evaluations of the prototype.

Some examples herein assume a source domain of textual queries and a target domain of textual answers, but as noted elsewhere the teachings herein also apply to other data types 425. Assume also that a few-shot prompt, a corresponding query Q and a LLM 132 denoted by FLLM 412, are provided. The terms "query" and "question" are used interchangeably herein with respect to model 132 prompts and outputs, unless indicated otherwise by reference numerals. Although this portion of the discussion assumes a provided few-shot prompt 402, tools and techniques taught herein are adaptable to many zero-shot tasks where the creation of few-shot prompts is feasible. The prompt is fed into the LLM to generate an answer to a query in the prompt. A detection task is performed to detect whether the generated answer suffers from hallucinations.

In this discussion of examples, a few-shot prompt 402 is constructed as a sequence of query-answer pairs 426. The pairs are denoted by {(qi, ai)} i=1 to n, where qi represents a query (a.k.a. question) 428 and ai represents that query's corresponding answer 430.

The prompt 402 can be expressed as follows:

$$\text{Pforward}=q1,a1,\ldots,qn,\text{an} \quad (1)$$

The FLLM is queried with a concatenation of the query Q on top of the prompt Pforward, which retrieves a generated answer 408 denoted by A*, signifying the response to the query Q. In other words, the prompt Pforward and the query Q are fed into the LLM as follows:

$$A^{*}=\text{FLLM}([\text{Pforward};Q]) \quad (2)$$

A detection task is to determine whether the generated answer A* exhibits hallucinatory content, which is accomplished in some embodiments using the InterrogateLLM method.

Some embodiments perform or leverage a backward process for reconstructing the original query Q from the generated answer A*. An example embodiment creates a new prompt 404 by reversing the given prompt Pforward. The reversed prompt rearranges 406 the order within each of the query-answer pairs 426 to form answer-query pairs 419. This portion of a reversed prompt denoted as Pbackward can be expressed as follows:

$$\text{Pbackward}=a1,q1,\ldots,\text{an},qn \quad (3)$$

The generated answer A* is then concatenated to the end of the reversed prompt Pbackward, and the entire sequence is passed in for processing by a BLLM 318, which includes the same FLLM 412, 132, a different LLM 132, or an ensemble of LLMs 132, depending on the embodiment. For ease of reference and clarity, this discussion refers to the LLMs involved in this step collectively as BLLM. In other words, this part of the process maps the generated answer back to the source domain, by querying one or more LLMs, which are each trying to reconstruct the original query Q. By denoting the set of reconstructed queries as Q*, this "backward" process (also referred to as a backward traversal) can be expressed as:

$$Q^{*}=\text{BLLM}([\text{Pbackward};A^{*}]) \quad (4)$$

Note that the size of Q* depends at least in part on the number of LLMs used in BLLM; as explained elsewhere, the size of Q* also depends at least in part on whether parameter variation 316 is employed to create multiple traversals per LLM of the BLLM. A motivation for employing a backward traversal 304 is to reconstruct the original query Q 310 based on the generated answer A*. An underlying presumption is that if the initial LLM 412 suffers from hallucinations during the generation of A*, then A* may drift away from the correct answer to Q during the backward traversal(s), that is, a backward process operating on A* is prone to deviating from Q on the way back when A* is a hallucination. In other words, a presumption (supported by the internal testing results) is that in the case of hallucination in A*, the set of reconstructed queries Q* is likely to diverge from the original query Q.

In some embodiments which utilize an InterrogateLLM approach, this backward process is repeated multiple times, e.g., K times for each model in BLLM with variable 316 temperature values, as explained elsewhere herein. Therefore, |Q*|=K*|BLLM|, where the vertical bars denote the size (magnitude) of the item between the vertical bars, and the asterisk denotes multiplication.

In some LLMs, a temperature parameter 440 influences the likelihood of selecting the next token during the answer generation process. A higher temperature (e.g., 1.0) makes the output more diverse and random, while a lower temperature (e.g., 0.2) makes the output more focused and deterministic.

Specifically, in some LLMs the temperature value is applied through a softmax function that transforms a vector into a probability distribution. In some text generation systems, the softmax function is applied to the model's logit vector, which corresponds to the supported tokens in the vocabulary. In some systems, the softmax operation can be written as shown in FIG. 12 Formula (5), where Pi is the probability of selecting the i-th token in the vocabulary, z is the logit vector, T is the temperature parameter and N is the number of tokens in the vocabulary. When T is high (low), the exponential function ezi/T is less (more) sensitive to small differences in the logit values, making the probabilities more diverse (focused).

Some embodiments which utilize an InterrogateLLM approach perform the backward process K times and introduce dynamic temperature adjustments 316 to support sufficient exploration. For example, some embodiments set the temperature of each backward process as shown in FIG. 13 Formula (6), where Ti represents the temperature for the i-th backward pass (0≤i<K), and T0 is the model's default temperature. This temperature scheduling 316 facilitates a controlled ascent in temperatures 440 across the multiple backward traversals 304, promoting enhanced exploration in the space of reconstructed queries 308, which contributes to the effectiveness of the embodiments.

To finally determine if A* 408 suffers from hallucination, a language embedding model (a.k.a. embedding space) 446 is utilized in some embodiments to assess the similarity 434 between the set of reconstructed queries Q* and the original query Q. Both the generated queries and the original query are transformed 1002 into vectors 432 within the same embedding space. For a given embedding model 446 Membedding: text→RD, which generates D-dimensional vectors from the input text, the embedding vector 418 for the original query Q is denoted as Qvec=Membedding (Q).

Similarly, the embedding vectors 420 for the generated queries 308 are denoted by Q*vec={Membedding(q*): ∀q*∈Q*}. Note that an alternate notation for Q*vec is Q* with a subscript vec; the asterisk in Q*vec distinguishes Q* from Q and does not denote multiplication.

Subsequently, the cosine similarity 434 between the embedding vectors 420 of the predicted queries Q*vec and the original query Qvec 418 is calculated 904 as shown in FIG. 14 formula (7), where C represents the cosine similarity function shown in FIG. 15 formula (8) for u, v∈RD, where D is the dimension of the vectors. In other words, the cosine similarity is calculated for each q*vec in the set Q*vec, and the results are averaged to obtain the final similarity score. In some variations, a different similarity metric 436 than cosine similarity is used, e.g., a dot product or a Euclidean distance.

Some embodiments which utilize an InterrogateLLM approach check whether the similarity score exceeds a predetermined threshold τ (also referred to her as tau) 456. In essence, when the reconstructed queries exhibit a significant divergence from the original query, these InterrogateLLM embodiments report a conclusion that there is a potential hallucination in A* without necessarily indicating the strength of that conclusion.

A representation of an InterrogateLLM method is illustrated in FIGS. 5, 6, and 7 collectively (the data flow is in that order), and is also outlined as pseudocode in Algorithm 1 in FIG. 11. With reference to FIGS. 5, 6, and 7, as shown in FIG. 5 a few-shot prompt and a query are fed into FLLM, which generates an answer. As shown in FIG. 6, the shots in the prompt are then reversed, forming a sequence of answer-question pairs, with the generated answer. The BLLM is then used to generate K queries that correspond to the generated answer. Ideally, in the absence of hallucination the generated queries will recover the original query from the forward phase. As shown in FIG. 7, the set of recovered questions 308 is then embedded by a language model and compared with the original question, producing a final score that indicates whether the generated answer suffers from hallucination.

To assess the efficacy of InterrogateLLM in detecting hallucinations, and due to an absence of suitable datasets for hallucination detection in few-shot prompt settings, internal prototype evaluation utilized adaptions of three public datasets 494. For each dataset, internal prototype evaluation utilized a text generation task along with a verification process to ensure the accuracy of the generated answers. The verification was implemented by employing simple heuristic functions that exploit additional information present in the datasets. During the evaluation of hallucination detection methods, the detection predictions were compared 1014 against the verification results. Notably, the InterrogateLLM method operated and operates independently of any external knowledge 448, making it versatile and applicable to a broad spectrum of tasks.

One evaluation dataset was adapted from a publicly available Movies Dataset, which contains a variety of details about movies released before July 2017. The dataset includes 26 million ratings and 750,000 tag applications for 45,000 movies provided by 270,000 users. A subset of 3000 samples with movie titles and release years associated with the movie cast was sampled from the Movies Dataset. The prototype internal evaluation task was for a model 132 to predict the cast of a movie based on the movie's name and release year. The few-shot prompt 402 contained a few examples mapping a movie's name and release year to its cast. The prompt question 310 was in the following format: "Query: What actors played in the x movie y?" where x is the release year and y is the movie name. Cast members' full names were expected in answers, and ground truth labels used Intersection Over Union (IOU) scores, considering any IOU score below 100% as a hallucination.

The second dataset used during prototype internal evaluation was derived from Amazon® data and included over 200,000 literary books (mark of Amazon.com, Inc.). This public dataset provided an overview of diverse literary books available on the Amazon platform. Each record included details like book title, authors, publishers, and publication year. A subset of 3000 samples was taken, including titles, dates, authors, and publishers. The prototype internal evaluation task was for a model 132 to predict the author and publication year based on the book title. The prompt questions were structured as "Who is the author of the book x, what year was it published?", where x is the book title. The ground truth was established by checking for a match between the elements (author name, release year) in the answer.

The third evaluation dataset was adapted from Global Country Information (GCI), a public dataset containing information on 195 countries. Detailed information about each country was provided, including its name, land area, capital or major city, gross domestic product, and more. This dataset offered a broad representation of global country information. In the GCI dataset, evaluation concentrated on country and capital pairs. The prototype internal evaluation task was for a model 132 to identify a country's capital by asking the model "What is the capital of x?"

The prototype internal evaluation set K=5 and threshold T=0.91 across all experiments. Maintaining a relatively small value for K facilitated rapid benchmarking of various models on datasets in the evaluation, which encompassed tens of thousands of generated answers. The hyperparameter T was determined through an analysis of ada002 embeddings on a third-party dataset. This involved embedding both similar and dissimilar sentence pairs within a Quora Question Pairs (QQP) dataset and selecting the optimal threshold that effectively distinguished between the two distributions. The initial temperature TO was set to the default temperature of each of the evaluated LLMs 412, specifically 0.6 for GPT-3 and both Llama-2 models. The embedding model 446 used in InterrogateLLM prototypes leverages OpenAI's model ada002. The experiments used one A100™ GPU (mark of Nvidia Corporation), where a single application of InterrogateLLM with the full method, utilizing an ensemble 318 of three models, took up to 2 seconds. Consequently, benchmarking a prototype InterrogateLLM across the three datasets took up to ~3.44 hours.

The internal evaluation compared InterrogateLLM prototypes to baselines. One baseline was BERT-cosine, which employed a pre-trained BERT model to embed both the query and the generated answer, calculated the cosine similarity between them, and predicted "hallucination" if the similarity fell below a threshold BERTT. The threshold was determined by using a process described above, with BERT embeddings. Another baseline was SBERT-cosine, which employed an SBERT backbone, similar to BERT-cosine. Another baseline was ADA-cosine which was similar to BERT-cosine but employed the OpenAI model ada002. Another baseline was SelfCheckGPT with Prompt, which employed the same FLLM in each task. SelfCheckGPT generated N additional stochastic LLM response samples, denoted as S1, S2, . . . , Sn, using the same query. Then it scored the consistency between the generated response and the stochastic samples, by querying the same LLM to determine whether the i-th sentence in A* is supported by sample Si. The final inconsistency score was computed by averaging all the sentence scores.

Internal testing evaluated InterrogateLLM on answers generated by three LLMs for each of the datasets and tasks described above. The LLMs evaluated were GPT-3 and Llama-2 (7b and 13b models). GPT-3 exhibited a lower hallucination rate across all datasets and tasks, compared to the Llama-2 models.

As to hallucination detection results, binary predictions (hallucinations or not) were compared to the ground truth test labels of each dataset. For each dataset and task, evaluation employed InterrogateLLM with four different model choices for the backward step (i.e., in the BLLM 318): GPT-3, Llama-2 (7B), and Llama-2 (13B), used individually, and also as an ensemble of all three models. Data gathered included the area under the curve (AUC) of the receiver operating characteristic, balanced accuracy (B-ACC), and F1 metrics.

The prototype variants improved upon all the baselines, particularly in comparison to SelfCheckGPT. This advantage of InterrogateLLM stems at least in part from predicting the query back (e.g., per FIG. 6) using the few-shot samples provided in the prompt, which is not a factor in SelfCheckGPT. Additionally, in many instances of hallucinations, the stochastic samples generated by SelfCheckGPT exhibited the same mistake. Therefore, the SelfCheckGPT algorithm erroneously predicted the hallucinated A* as factual truth. This illustrates a benefit of the InterrogateLLM backward validation strategy, which differs from the query that initially caused the hallucination. Within the evaluated variants of the InterrogateLLM method, the use of an ensemble BLLM in the backward process exhibited sizeable strides across the board, suggesting that model diversity can compensate for individual model weaknesses.

The internal evaluation included an ablation study to examine the impact of the multiple K backward processes performed in InterrogateLLM (e.g., per FIG. 11, Algorithm 1 line 4), the effectiveness of the variable temperature values (e.g., per FIG. 13 Formula (6)), and the importance of the average function in FIG. 14 Formula (7).

The results revealed that utilizing $K>1$ in the backward step was beneficial during experiments in all three datasets. Notably, the best results were consistently obtained with higher K values, where $K=5$ (the highest value tested) took the lead in the majority of cases. The results indicated that increasing the value of K would potentially enhance the results, albeit at the expense of additional computational resource usage. In addition, the ensemble of all three models (GPT-3, Llama-2 (7B), and Llama-2 (13B)) yielded the highest performance across all K values. This indicated again that combining recovery scores from multiple models enhances hallucination detection.

The internal evaluation included investigation of varying temperatures 440 for the backward process. For each index $i \in \text{range}(K)$, the InterrogateLLM method utilized a variable temperature $T_i$ as defined in Formula (6). This adjustment in temperature aimed to augment the creativity and stochastic aspects of the backward model BLLM throughout the query reconstruction process, fostering the generation of a more diverse set of reconstructed queries 308. The results of investigating InterrogateLLM with $K=5$, which compared using the same temperature through all the backward processes versus using variable temperatures per InterrogateLLM, indicated that the variable temperature was highly beneficial for most experiments.

The internal evaluation encountered some limitations. As to source and target domain pairs which have a many-to-one mapping, generated answers associated with multiple different queries posed challenges in verification with InterrogateLLM. The backward traversal process can readily reconstruct a diverse set of query candidates, deviating from the original query. As to hallucinating back and forth, instances were observed where a single backward process by the same LLM model which hallucinated an answer could reconstruct the same query. This severe hallucination indicates a symmetric mapping between a query and a hallucinated answer, implying hallucinations in both directions. However, the evaluation showed a mitigation of this issue when the prototype employed an ensemble 318 of models. As to detecting hallucinations in semi-truth answers, identifying hallucinations in semi-truth answers proved challenging. In some cases, the model only hallucinated a small portion of the answer (e.g., generating an entire cast of a movie with one additional actor who was not actually part of the movie). InterrogateLLM was able to recover the original movie, but failed to detect the low-severity hallucination within the answer.

Although retrieval of context for answer verification is not required, InterrogateLLM can be used together with an extension to retrieval augmented generation (RAG) settings, where a query is provided with a retrieved-context 448, and the task is to generate an answer based at least in part on the information provided in the context.

With regard to an average-max analysis, part of the internal evaluation included, for each query, obtaining a list of size K containing cosine similarity scores, representing the similarity between the generated query and the original query. To ascertain the closeness of the generated query to the original, prototypes employed two strategies: the maximum (Max) or the average (Average) of the K cosine similarity scores. In the majority of cases, the average outperformed the maximum, indicating a more robust measure 438 for query similarity 434. An average calculation is shown as Formula (7); the corresponding maximum calculation is not shown but has AVG replaced by MAX. Average calculation possibly performs better due to the sensitivity of the maximum strategy to noisy cosine similarity scores, which tend to be prevalent in certain instances. Evaluation results analysis suggests that the average is a more reliable indicator of query similarity, providing a stable and effective metric for the evaluation of the query reconstruction approach.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage-RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as embedding 1002 data in an embedding space 446, calculating 904 a vector distance 438, withholding 908 data from a user interface and thereby maintaining 1010 the data inside a computing system in a form 466 that is not human-perceptible, traversing 304 a language model 132 and thus executing the language model 132, and automatically controlling 1016 a device 478 based on output 136 from a language model 132, which are each an activity deeply rooted in computing technology. Some of the technical mechanisms discussed include, e.g., language models 132, prompters 210, embedders 212, measurers 214, hallucination detection software 302, parameter variation 316 software, and backward language model sets 318. Some of the technical effects discussed include, e.g., detecting 206 a hallucination without relying on an external ground truth 448, detecting 206 a hallucination without inspecting a language model's internal state, improving hallucination detection by use of an ensemble 318 of language models for back traversal 304, improving hallucination detection by use of parameter variation 316 in a back traversal 304 language model set 318, and reduced consumption of computational resources by maintaining 1010 unacceptable answers 430 inside a computing system in a form 466 that is not human-perceptible instead of displaying 126 them 430. Thus, purely mental processes and activities limited to pen-and-paper are clearly excluded from the scope of any embodiment. Other advantages based on the technical characteristics of the teachings will also be apparent to one of skill from the description provided.

One of skill understands that artificial intelligence activity is technical activity which cannot be performed mentally, by definition—the "artificial" in "artificial intelligence" denotes activity within a computing system 102. Language models 132 are part of artificial intelligence technology. Hence, language model hallucination detection technology improvements such as functionality 204 described herein are improvements to computing technology.

Also, in some embodiments hallucinations and related data are withheld from human view (e.g., withheld from a user interface) by design and through normal operation of the embodiment. Logically, such an embodiment cannot be performed mentally or on paper, because a human mind cannot both perceive the data (e.g., to assign or respond to a hallucination extent) and not perceive the data (because it is withheld from the interface which would permit the human to perceive it).

One of skill also understands that attempting to manually embed 1002 queries in a model 446 or to manually measure 438 query similarity would create unacceptable delays in program execution, pose severe reputation risks, and introduce a severe risk of unacceptable human errors. People manifestly lack the speed, accuracy, memory capacity, and specific processing capabilities required to perform language model hallucination detection 206 as taught herein.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical application such as any application 122 (*a*) which provides or utilizes output 136 that is generated at least in part by a language model 132, and (b) for which a hallucinated output results in extra expense, unwanted risk, undesirable resource consumption, or other harm. This includes most if not all applications which provide or utilize output generated at least in part by a language model.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not.

Rather, the present disclosure is focused on providing appropriately specific embodiments whose technical effects fully or partially solve particular technical problems, such as how to detect a model-generated hallucination without relying on an external ground truth, how to detect a model-generated hallucination without inspecting the model's internal state, how to improve automatic hallucination detection, and how to reduce consumption of electric power and other computational resources spent as a result of model-generated hallucination. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, language models, prompts, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Notations

Some teachings are presented herein using various notations. For example, mathematical notations using subscripts, superscripts, and glyphs found only in relatively few fonts are disfavored in the claims and in much of the disclosure, in order to reduce the risk of errors and the effort required to localize this disclosure for different jurisdictions. However, this choice does not mean that mathematical notations are prohibited; they are used, e.g., in FIGS. 11 to 15.

To promote legibility, generality, and typographical convenience, subscripts, superscripts, special fonts, and other mathematical notations are generally avoided in claims presented for consideration within or based on this disclosure. However, items denoted in the disclosure using mathematical notations are examples of corresponding items recited in (or available to be recited in) one or more claims.

The primary notation used herein places index variables such as i on the normal line of type, for typographical convenience. However, subscripts or superscripts or both could also be used. For example, i may be positioned as a subscript i appended to q and as a subscript i appended to a. Similarly, to indicate a set {(qi, ai)} in which i goes from 1 to n, i=1 is appended after the set closing brace} as a subscript and n is appended after that set closing brace} as a superscript. A subscript and superscript notation is used in Algorithm 1 pseudocode in FIG. 11.

For convenience, the following list correlates some of the notations used herein:

Pforward==forward prompt
FLLM==first language model
qi,ai==question-answer pair
qi==question
ai==corresponding answer
Q==primary question
A*==primary answer
Pbackward==backward prompt
FLLM==first language model
BLLM==backward language model set
q*==candidate question (candidate for recovering Q)
Membedding==embedding model
sim (Q, Q*)==vector similarity measurement

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin (x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 138 may be private, public, community, or a hybrid, and cloud services may be offered in the form of infrastructure as a service (laaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "method"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Hallucination detection operations such as submitting 802, 806, obtaining 804, acquiring 808, procuring 902, calculating 904, assigning 812, and many other operations discussed herein (whether recited in the Figures or not), are understood to be inherently digital. A human mind cannot interface directly with a CPU or other processor, or with RAM or other digital storage, to read and write the necessary data to perform the hallucination detection steps 1000 taught herein even in a hypothetical or actual prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as acquiring, ascertaining, assigning, calculating, changing, comparing, controlling, deriving, detecting, determining, embedding, executing, getting, gleaning, incrementing, limiting, maintaining, measuring, obtaining, procuring, prompting, quantifying, rephrasing, reporting, submitting, substituting, traversing, varying, withholding (and acquires, acquired, ascertains, ascertained, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms; separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and having a distinct identifier such as an IP address or a MAC (media access control) address; may be a physical machine or be a virtual machine implemented on physical hardware

102 computer system, also referred to as a "computational system" or "computing system", and when in a network may be referred to as a "node"

104 users, e.g., user of an enhanced system 202

106 peripheral device

108 network generally, including, e.g., LANs, WANs, software-defined networks, clouds, and other wired or wireless networks

110 processor or set of processors; includes hardware

112 computer-readable storage medium, e.g., RAM, hard disks; also referred to as storage device

114 removable configured computer-readable storage medium

116 instructions executable with processor; may be on removable storage media or in other memory (volatile or nonvolatile or both)

118 digital data in a system 102; data structures, values, source code, and other examples are discussed herein

120 kernel(s), e.g., operating system(s), BIOS, UEFI, device drivers; also refers to an execution engine such as a language runtime

122 software tools, software applications, security controls; hardware tools; computational

126 display screens, also referred to as "displays"

128 computing hardware not otherwise associated with a reference number 106, 108, 110, 112, 114

130 prompt which has syntax and data type allowing submission of the prompt to a language model; digital

132 language model or other machine learning model in a computing system, e.g., language model which is not necessarily a large language model, large language model (LLM), multimodal language model, or foundation model; computational

134 language model interface, e.g., API; computational

136 output from execution of a language model; digital

138 cloud, also referred to as cloud environment or cloud computing environment

202 enhanced computing system, i.e., system 102 enhanced with functionality 204 as taught herein

204 language model hallucination detection functionality (also referred to as hallucination detection functionality 204 or functionality 204), e.g., software or specialized hardware which performs or is configured to perform steps 304 forward, 304 backward, 306, and 312, or steps 802, 804, 806, 808, 902, 904, and 812, or steps 802, 804, 806, 808, 810, and 812, or any software or hardware which performs or is configured to perform a novel method 1000 or a computational machine learning model 132 hallucination detection functionality activity first disclosed herein

206 computationally detect hallucinated content in output 136 of a machine learning model 132, e.g., by performing at least a forward traversal, a backward traversal (a.k.a. back traversal), and comparing a distance based on question vectors resulting from the back traversal to a threshold

208 hallucinated content in output 136 of a machine learning model 132, i.e., content which is contrary to validated retrieved context 448, or is internally logically inconsistent with itself, or states as a fact the existence of an event or item or being which does not actually exist (or did not exist at the relevant time), or is deemed false by a court or other legal authority or by society generally or by peer-reviewed scientific consensus, or is described as false or misleading by a majority of the parties who rely on it; also referred to as hallucination or fabrication or as content that is false, that lacks truth, that lacks veracity, or lacks fidelity

210 prompter mechanism which conforms with FIG. 5 or FIG. 6 or both, or performs model prompting as taught herein; computational

212 embedder mechanism which conforms with FIG. 7, or performs question embedding 1002 as taught herein; computational

214 measurer mechanism which conforms with FIG. 7, or performs question calculating 904 with question vectors as taught herein; computational

216 hallucination extent; digital; some hallucination extent examples include a vector distance between a primary question vector and a candidate question vector, a vector distance between a primary question vector and an average or max function of multiple candidate question vectors, a normalized or otherwise scaled form of either such vector distance, or a Boolean value which is based on a comparison of any of the foregoing with a threshold

302 hallucination detection software, i.e., software which upon execution performs any sequence implementing functionality 204, including the sequence shown in FIG. 3

304 computationally traverse a language model, i.e., execute a language model in response to either a forward prompt 402 or a backward prompt 404, or cause such execution of a language model

306 computationally compare candidate question(s) to a primary question by step 810 or by steps 902 and 904

308 candidate question, as represented in a computing system 102

310 primary question, as represented in a computing system 102

312 computationally quantify an extent of a hallucination, e.g., by computing a hallucination extent 216

314 model 132 parameter, as represented in a computing system 102

316 computationally vary a parameter 314, e.g., create a sequence of different parameter values; reference numeral 316 also refers to a result of such computational activity or software which implements such computational activity; some examples are also referred to using reference numeral 316, e.g., dynamic temperature adjustments 316, temperature scheduling 316

318 backward set of models; examples are also referred to as model set 318 or backward model set 318 or backward language model set 318 or BLLM 318; reference numeral 318 also refers to an individual model 132 in the model set, e.g., backward traversal model 318 or backward traverse machine learning model 318; in situations where the set 318 contains multiple models 132, a structure referenced by reference numeral 318 is also referred to as ensemble 318 (ensemble means at least two)

320 computationally vary a model set 318, e.g., by changing which model(s) are part of the set 318

322 computationally rephrase a question or an answer

324 ordering of pairs 419 or 426, as represented in a computing system 102

326 interface in a computing system, e.g., user interface, device control interface, program-to-program interface such as an API

401 duration of time, as represented as data 118 in a computing system; digital

402 forward prompt 130; digital

403 time or date or set of times or set of dates, as represented as data 118 in a computing system; digital

404 backward prompt 130; digital

405 cite to authority, as represented as data 118 in a computing system; digital

406 computationally reverse order within a pair, e.g., from question-answer to answer-question; 406 also refers to a result of such activity; also referred to as rearrangement

407 identifier, as represented as data 118 in a computing system, e.g., number, index, string, hash, etc.; digital

408 primary answer; digital

409 location (e.g., real world, or in a network), as represented as data 118 in a computing system; digital

410 model testing framework, e.g., any embodiment of functionality 204 which does not contain a model 412 but it configured to interface with such a model for hallucination detection; computational

411 public or private statement, as represented as data 118 in a computing system; digital

412 model 132 which is being tested by functionality 204 to find out whether it generated/generates a hallucination

413 name, as represented as data 118 in a computing system; digital

414 user interface in a computing system; computational, includes hardware

415 status, as represented as data 118 in a computing system; digital

417 information, as represented as data 118 in a computing system; digital

418 n-dimensional vector representing primary question; digital and hence not merely on paper or mental

419 answer-question pair; digital

420 n-dimensional vector representing a candidate question; digital and hence not merely on paper or mental

421 amount of unacceptable answers; digital

422 interface 326 to a model 132 for forward traversal

423 control sequence, e.g., command script or list of instructions, as represented as data 118 in a computing system; digital

424 interface 326 to a model 132 for backward traversal

425 data type as represented in a computing system; digital

426 question-answer pair; digital

428 question in a prompt 130 or output 136, also referred to as query; digital

430 answer in a prompt 130 or output 136; digital

432 n-dimensional vector generally; digital

434 similarity of vectors, as represented in a computing system

436 vector similarity metric, e.g., cosine similarity, or a computation based on Formula (7) or the MAX alternate to Formula (7)

438 vector similarity measurement, also referred to as vector distance, e.g., a numeric value output by a metric 436 given two or more vectors; some examples include a cosine distance between two vectors, and a distance produced by computation based on Formula (7) or the MAX alternate to Formula (7); digital

440 language model temperature parameter or value thereof; digital

442 language model top-p parameter or value thereof; digital

444 language model top-k parameter or value thereof; digital

446 embedding space, also referred to as embedding model; computational, digital

448 retrieved context, also referred to as a source of ground truth or external knowledge; digital

450 verified answer, e.g., answer 430 which is determined 1024 to match retrieved context or is other deemed free of hallucination content; digital

452 input data; digital

454 human review of data for accuracy, as represented in a computing system

456 threshold; digital

458 acceptability of an answer, as represented in a computing system; depending on the embodiment and configuration, an answer is acceptable if it has no detected hallucination content, or if it has less than a specified amount of hallucination content

460 configuration (e.g., parameter) or other setting in a computing system; digital

462 substitute question 428; digital

464 characteristic of not being human-perceptible, e.g., being stored only in a memory 112 or represented only in a processor 110, and not displayed on a screen 126 or on a printout or emitted as audio; this characteristic pertains to data 118 in a computing system 102

466 data form, either human-perceptible or not human-perceptible

468 sequence, as represented in a computing system

470 characteristic of being semantically interchangeable, e.g., items are semantically interchangeable when they have the same meaning to a human or a machine learning model or a controlled device, where meaning is expressed as action taken or action avoided in response to an item

472 semantically interchangeable question 428; digital

474 increment; digital

476 different answer 430; digital

478 controlled device 101, e.g., device 101 which takes or avoids action based at least in part on output of a model 132

480 text 482 in a natural language; digital

482 text as represented in a computing system; digital

484 source code text 482 in a programming language, e.g., HTML, SQL, etc.; digital

486 image as represented as data 118 in a computing system; digital

488 video as represented as data 118 in a computing system; digital

490 audio as represented as data 118 in a computing system; digital

492 sensor data as represented as data 118 in a computing system; digital

494 dataset of data 118 in a computing system; digital

496 amount, e.g., quantity or count, as represented as data 118 in a computing system; digital

498 action as represented as data 118 in a computing system; digital

502 pforward portion of forward prompt; digital

602 pbackward portion of backward prompt; digital

702 non-Boolean hallucination extent 216

704 Boolean hallucination extent 216

800 flowchart; 800 also refers to hallucination detection methods that are illustrated by or consistent with the FIG. 8 flowchart or any variation of the FIG. 8 flowchart described herein

802 computationally submit a forward prompt to an FLLM 412, e.g., via an FLLM interface 422

804 computationally obtain a primary answer from an FLLM 412 in response to a forward prompt, e.g., via an FLLM interface 422

806 computationally submit a backward prompt to a BLLM 318, e.g., via a BLLM interface 424

808 computationally acquire a candidate query from a BLLM 318 in response to a backward prompt, e.g., via a BLLM interface 424

810 computationally get a vector distance between a primary question and at least one candidate question, e.g., via an API to an embedder 212 or measurer 214, or by performing steps 902 and 904

812 computationally assign a hallucination extent based on at least a vector distance from step 810 or an equivalent activity, e.g., by assigning any of the hallucination extent values taught herein to a digital variable representing hallucination extent in a computing system

900 flowchart; 900 also refers to hallucination detection methods that are illustrated by or consistent with the FIG. 9 flowchart or any variation of the FIG. 9 flowchart described herein

902 computationally procure an embedding vector for a question, e.g., using an embedding space 446 API

904 computationally calculate a vector distance, e.g., by using an API to software which implements one or more vector metrics 436

906 computationally report a hallucination extent, e.g., via a user interface, a device control interface, or another API

908 computationally withhold a hallucination extent from a user interface, e.g., by skipping an instruction 116 that passes a hallucination extent to a user interface in a situation where not skipping the instruction would supply the hallucination extent to the user interface for visual or aural presentation

910 computationally prompt a model 412 for a different answer, e.g., by repeating part (steps 802 and 804) or all of method 800 or method 900 when an obtained 804 answer or its subsequent potential replacement is not acceptable

1000 flowchart; 1000 also refers to hallucination detection methods that are illustrated by or consistent with the FIG. 10 flowchart, which incorporates the FIG. 8 flowchart, the FIG. 9 flowchart, and all other steps taught herein, or methods that are illustrated by or consistent with any variation of the FIG. 10 flowchart described herein

1002 computationally embed a question in as a vector 432

1004 computationally limit usage of unacceptable model answers, e.g., by not providing them to a user interface for presentation or to a device control interface for device control

1006 computationally derive an answer-question pair from a question-answer pair

1008 computationally change the order of two or more pairs within a sequence of answer-question pairs relative to a corresponding sequence of question-answer pairs

1010 computationally maintain data in a form that is not human-perceptible, e.g., by not providing the data to a system 202 user interface for presentation to a user (other than a system 202 developer during system development or a system 202 tester during system testing, for example)

1012 computationally glean a substitute question from another question such as from a primary question or a prior substitute for a primary question

1014 computationally compare a vector distance 438 to a threshold

1016 computationally control a device based at least partly on model 132 output; this may include computationally translating answers 430 into control commands to, e.g., instruct a device controller how to operate a device, enable a device, or disable a device

1018 computationally ascertain acceptability status of an answer, i.e., whether the answer is sufficiently free of hallucination content to be acceptable

1020 computationally limit looping 1022

1022 computationally loop through traversals 304, quantifications 312, and ascertainments 1018 in pursuit of a better answer than the least hallucinated answer obtained thus far to a primary question; 1022 also refers to such a loop structure

1024 computationally determine accuracy (a.k.a., truth, veracity, fidelity) of an answer based at least partially on comparison to retrieved content or another technique that does not rely on forward and backward traversal and measuring the distance between a candidate answer and a primary answer

1026 any step or item discussed in the present disclosure that has not been assigned some other reference numeral; 1026 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

In some embodiments, a language model 412, 132 forward traversal 304 with a few-shot learning forward prompt 402 yields a primary answer 408 from a primary question 310. Then at least one backward traversal 304 yields at least one candidate question 308 using backward prompt(s) 404 with answer-question pairs 419 derived from the forward prompt's question-answer pairs 426. Each backward prompt 404 also includes the primary answer 408 but not the primary question 310. Each backward traversal 304 is through a set 318 of one or more language models 132, which does not necessarily include the forward traversal's language model 412. Sometimes backward traversals 304 vary 316 a model parameter 314, in particular one or more of: temperature 440, top-p 442, or top-k 444. A vector distance 438 calculated 810, or 902 and 904, between at least some candidate question vectors 420 and a primary question vector 418 indicates in the form of a hallucination extent 216 whether the primary answer 408 includes hallucination content 208, and in some cases how much. Some embodiments withhold 908 hallucinated answers from user interfaces 414 and device 478 control interfaces 326. Some embodiments also loop 1022 to obtain an answer 430 with less hallucination content 208.

Embodiments are understood to also themselves include or benefit from tested and appropriate security controls and privacy controls such as the General Data Protection Regulation (GDPR). Use of the tools and techniques taught herein can be used together with such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A large language model (LLM) hallucination detection method, comprising automatically:

submitting, via a first forward LLM interface, a forward prompt to a first large language model in a computing system, the forward prompt including a question-answer pair and a primary question, the primary question being unaccompanied by an answer;

in response to submitting the forward prompt, obtaining a primary answer generated by the first large language model;

deriving, from the question-answer pair of the forward prompt, an answer-question pair by pair component order reversal of the question-answer pair, and assembling a backward prompt that includes the answer-question pair and the primary answer obtained from the first large language model and excludes the primary question;

submitting, via a backward LLM interface, the backward prompt to a backward large language model set comprising at least two different LLMs in the computing system, at least two times per model under a scheduled variation of a language-model sampling parameter selected from temperature, top-k, or top-p, where successive submissions differ by a stored increment;

in response to submitting the backward prompt, acquiring a plurality of candidate questions generated by the backward large language model set;

computing, using a text-embedding model, a primary question embedding vector which is computationally procured from the primary question, and a plurality of candidate question embedding vectors which are computationally procured from the plurality of candidate questions;

computing an aggregate similarity score between the primary question embedding vector and the plurality of candidate question embedding vectors;

comparing the aggregate similarity score to a stored threshold to assign a hallucination extent; and responsive to the hallucination extent indicating unacceptability, automatically withholding the primary answer from any user interface display and storing the primary answer in a non-human-perceptible form in memory of the computing system.

2. The method of claim 1, comprising at least one of:

deriving the answer-question pair from the question-answer pair by the pair component order reversal and also at least by rephrasing the question or rephrasing the corresponding answer to the question, or rephrasing both; or changing an order of pairs, such that the backward prompt includes at least two answer-question pairs which individually correspond to respective question-answer pairs in the forward prompt, but the answer-question pairs appear in a different order in the backward prompt than the corresponding pairs in the forward prompt.

3. The method of claim 1, further comprising:

in response to the hallucination extent indicating unacceptability, prompting the first large language model for another answer to the primary question, or prompting the first large language model for an answer to a substitute question, wherein the substitute question is computed from at least the primary question or the substitute question is semantically interchangeable with the primary question, or both.

4. The method of claim 1, wherein a candidate question of the plurality of candidate questions equals the primary question, and the method further comprises determining whether the primary answer is a hallucination, the determining being independent of the aggregate similarity score.

5. A computing system configured as a large language model testing framework, the system comprising:

a user interface;

a digital memory set comprising at least one digital memory, the digital memory set containing a forward large language model interface and a backward large language model interface;

a processor set comprising at least one processor, the processor set in operable communication with the digital memory, the processor set configured to perform a large language model hallucination test which includes (a) submitting, via the forward large language model interface, a forward prompt to a first large language model, the forward prompt including a question-answer pair and a primary question, the primary question being unaccompanied by an answer, (b) obtaining a primary answer generated by the first large language model, (c) deriving, from the question-answer pair of the forward prompt, an answer-question pair by pair component order reversal of the question-answer pair, and assembling a backward prompt that includes the answer-question pair and the primary answer obtained from the first large language model and excludes the primary question, submitting, via the backward large language model interface, the backward prompt to a backward large language model set comprising at least two different LLMs, at least two times per model under a scheduled variation of a language-model sampling parameter selected from temperature, top-k, or top-p, where successive submissions differ by a stored increment, (e) acquiring a plurality of candidate questions generated by the backward large language model set, (f) computing, using a text-embedding model, a primary question embedding vector which is computationally procured from the primary question, and a plurality of candidate question embedding vectors which are computationally procured from the plurality of candidate questions, (g) computing an aggregate similarity score between the primary question embedding vector and the plurality of candidate question vectors, (h) comparing the aggregate similarity score to a stored threshold to assign a hallucination extent, and (i) responsive to the hallucination extent indicating unacceptability, automatically withholding the primary answer from the user interface and storing the primary answer in a non-human-perceptible form in the digital memory set.

6. The computing system of claim 5, comprising at least one of:

the forward large language model interface interfaces with a forward large language model, and the system comprises the forward large language model;

the backward large language model interface interfaces with a backward large language model set, the system comprises the backward large language model set, and the backward large language model set includes the forward large language model;

the backward large language model interface interfaces with a backward large language model set, the system comprises the backward large language model set, and the backward large language model set does not include the forward large language model;

the backward large language model interface interfaces with a backward large language model set which includes multiple large language models, and the system comprises the backward large language model set;

the backward large language model interface interfaces with a backward large language model set which includes exactly one large language model, and the system comprises the backward large language model set;

a single application program interface serves as both the forward large language model interface and the backward large language model interface; or a first application program interface serves as the forward large language model interface and a second different application program interface serves as the backward large language model interface.

7. The computing system of claim 5, wherein the processor is configured to submit a sequence of backward prompts to the backward large language model interface, to acquire a corresponding sequence of candidate questions from the backward large language model interface, to procure a corresponding sequence of candidate question embedding vectors, and to calculate the aggregate similarity score from at least the primary question embedding vector and the candidate question embedding vectors.

8. The computing system of claim 5, wherein responsive to the hallucination extent indicating unacceptability, the processor is configured to prompt through the forward large language model interface for a different answer.

9. The computing system of claim 5, wherein responsive to the hallucination extent indicating unacceptability, the system is configured to control a device using acceptable answers without using more than a specified amount of unacceptable answers, and the device includes at least one of: a vehicle, a robot, a communications device in a network, a wearable computing device, an internet of things device, a smart phone, or a device configured for game play.

10. The computing system of claim 5, wherein responsive to the hallucination extent indicating unacceptability, the system is configured to send generated output to the user interface using acceptable answers without using more than a specified amount of unacceptable answers, and the generated output includes at least one of: a natural language text, a source code text, a portion of an image, a portion of a video clip, a portion of an audio clip, a portion of a sensor data clip, or a portion of an industrial control sequence.

11. A computer-readable storage device configured with data and instructions which upon execution by a processor perform a method of testing large language model output, the method comprising automatically:

submitting, via a first forward LLM interface, a forward prompt to a first large language model in a computing system, the forward prompt including a question-answer pair and a primary question, the primary question being unaccompanied by an answer;

in response to submitting the forward prompt, obtaining a primary answer generated by the first large language model;

deriving, from the question-answer pair of the forward prompt, an answer-question pair by pair component order reversal of the question-answer pair, and assembling a backward prompt that includes the answer-question pair and the primary answer obtained from the first large language model and excludes the primary question;

submitting, via a backward LLM interface, the backward prompt to a backward large language model set comprising at least two different LLMs in the computing system, at least two times per model under a scheduled variation of a language-model sampling parameter selected from temperature, top-k, or top-p, where successive submissions differ by a stored increment;

in response to submitting the backward prompt, acquiring a plurality of candidate questions generated by the backward large language model set;

computing, using a text-embedding model, a primary question embedding vector which is computationally procured from the primary question, and a plurality of candidate question embedding vectors which are computationally procured from the plurality of candidate questions;

computing an aggregate similarity score between the primary question embedding vector and the plurality of candidate question embedding vectors;

comparing the aggregate similarity score to a stored threshold to assign a hallucination extent; and responsive to the hallucination extent indicating unacceptability, automatically withholding the primary answer from any user interface display and storing the primary answer in a non-human-perceptible form in memory of the computing system.

12. The computer-readable storage device of claim 11, wherein the primary answer belongs to a first dataset, and at least a portion of the method is repeated with a second dataset, and respective hallucination extents for the datasets are reported via the user interface.

13. The computer-readable storage device of claim 11, wherein the primary question includes text.

14. The computer-readable storage device of claim 11, wherein at least one of the primary question and the primary answer include source code.

15. The computer-readable storage device of claim 11, wherein at least one of the primary question and the primary answer represent at least one of: a time, a calendar date, a duration, a location, an amount of money, a cite to a legal authority, a statement of a human person or a legal person, an output of a computing system, an action of a human person or a legal person or a computing system, a human person's name, a legal person's name, a computing system identifier, a device identifier, a health status, a legal status, a financial status, confidential or proprietary information, medical information, military information, national security information, information which is subject to governmental regulation, or personal identifiable information.

* * * * *